US008243306B2

(12) United States Patent
Inoue

(10) Patent No.: US 8,243,306 B2
(45) Date of Patent: Aug. 14, 2012

(54) COMMUNICATION PROGRAM, METHOD OF INSTALLING IMAGE PROCESSING APPARATUS CONTROL PROGRAM AND IMAGE PROCESSING APPARATUS

(75) Inventor: Shigeki Inoue, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1301 days.

(21) Appl. No.: 11/943,732

(22) Filed: Nov. 21, 2007

(65) Prior Publication Data
US 2008/0123135 A1 May 29, 2008

(30) Foreign Application Priority Data

Nov. 27, 2006 (JP) .................................. 2006-318097

(51) Int. Cl.
G06F 3/12 (2006.01)
G06K 15/00 (2006.01)
(52) U.S. Cl. ....... 358/1.15; 358/1.16; 718/168; 718/174
(58) Field of Classification Search .................. None
See application file for complete search history.

(56) References Cited

U.S. PATENT DOCUMENTS

| 6,567,175 | B1 * | 5/2003 | Lee | 358/1.14 |
| 2005/0128519 | A1 | 6/2005 | Yamauchi | |
| 2005/0190399 | A1 * | 9/2005 | Nakaoka et al. | 358/1.15 |
| 2005/0257225 | A1 * | 11/2005 | Choi et al. | 719/321 |
| 2006/0103881 | A1 * | 5/2006 | Matsuda | 358/1.15 |
| 2007/0019236 | A1 * | 1/2007 | Sando | 358/1.15 |
| 2007/0097400 | A1 * | 5/2007 | Yasui et al. | 358/1.13 |

FOREIGN PATENT DOCUMENTS

| JP | 2001117835 A | * | 4/2001 |
| JP | 2002229751 A | | 8/2002 |
| JP | 2005170000 A | | 6/2005 |
| JP | 2005-190167 A | | 7/2005 |
| JP | 2005352852 A | * | 12/2005 |

* cited by examiner

Primary Examiner — Marivelisse Santiago Cordero
Assistant Examiner — Huo Long Chen
(74) Attorney, Agent, or Firm — Panitch Schwarze Belisario & Nadel LLP

(57) ABSTRACT

An image processing apparatus and a host apparatus are connected to a network. Before the host apparatus uses the image processing apparatus for the first time, a communication program and information describing the image processing apparatus and its network address are transferred from the image processing apparatus to the host apparatus, and the host apparatus runs the communication program. On the basis of the transferred information, the communication program accesses a driver server through the network, downloads an image processing apparatus control program, installs the image processing apparatus control program in the host apparatus, and makes necessary settings. An up-to-date version of the control program for the image processing apparatus is thereby installed in the host apparatus without the need for input from the user.

16 Claims, 21 Drawing Sheets

FIG.3A

[Printer]

FIG.3B

[Printer]
IPAddress=<IP ADDRESS>
Model=<MODEL NAME>
Location=<SERVER ADDRESS>
¥Drivers

FIG.3C

| USB MEMORY |
|---|
| ☐ DrvInstaller.exe |
| 📄 Install.ini |

| OS VERSION | IDENTIFIER |
|---|---|
| Windows 95/98/Me | Win9x |
| Windows NT4.0 | WinNT |
| Windows 2000/XP/Server 2003 | Win2kXP |
| Windows XP x64Edition/Server 2003 x64Edition | Winx64 |

| LOCALE ID (DECIMAL) | IDENTIFIER |
|---|---|
| 1041 | JPN |
| 1033 | ENU |
| 2057 | ENG |
| 1036 | FRA |

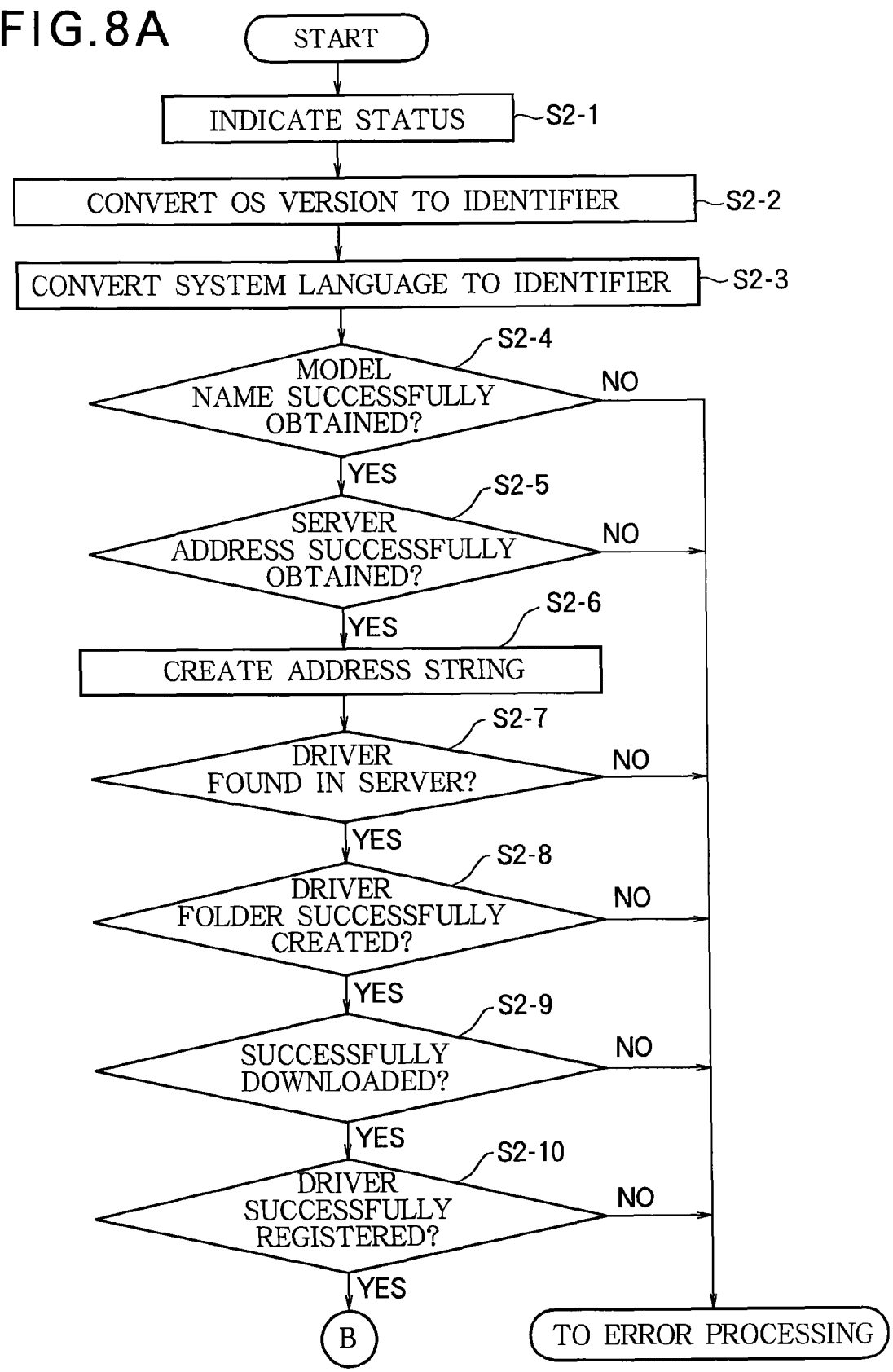

US 8,243,306 B2

COMMUNICATION PROGRAM, METHOD OF INSTALLING IMAGE PROCESSING APPARATUS CONTROL PROGRAM AND IMAGE PROCESSING APPARATUS

BACKGROUND OF THE INVENTION

1. Field of the Invention

The present invention relates to a method of installing an image processing apparatus control program in a host apparatus to control an image processing apparatus with which the host apparatus communicates via a network. The invention also relates to a communication program for implementing the invented method, and a network printer including the invented communication program.

2. Description of the Related Art

In today's workplaces, it is commonplace for a host apparatus such as a personal computer to send image processing commands to an image processing device such as a printer through a network. In preparation, it is generally necessary to install an image processing apparatus control program such as a printer driver in the host apparatus, make settings related to features and options of the image processing apparatus, and select the host output port used by the image processing apparatus control program.

Since printer drivers and other image processing apparatus control programs are updated from time to time, the user of the host apparatus would prefer to use the latest program version. One recent method of enabling this to be done is to store printer drivers, for example, in an administrative server connected to the network, where the driver software can be kept up to date easily. The host apparatus, operating as a client, accesses the administrative server by specifying its uniform resource locator (URL: an address that indicates the location of the server on the network) and reads and displays a list of available network printers. The user selects the printer he or she wants to use on the basis of its model name, internet protocol (IP) address, or other information, and downloads the corresponding printer driver, thereby obtaining the latest version of the printer driver.

A way to simplify the tasks of installing a printer driver in a host apparatus and making settings related to the printer's features and options is also known (see, for example, Japanese Patent Application Publication No. 2005-190167): a special communication application program is stored in the host apparatus; when the host apparatus is connected to a network, the communication application program automatically searches for the administrative server on the network, then obtains a list of printers and printer drivers that the host apparatus can use from the administrative server and displays information such as the printers' model names and IP addresses on a display at the host apparatus; when the user selects one of the printers on the basis of the displayed information and enters a printing command for the printer, the application communication program determines whether a printer driver for the selected printer is already installed, and if it is not, automatically downloads the printer driver from the administrative server and executes the printing process.

If the communication application program is stored in the host apparatus and operates as above, however, when selecting the printer, the user is confronted with a confusingly large amount of displayed information, including IP addresses and printer model names that the user may have never known or already forgotten, and technical information about features and options that the user may not clearly understand. To select the right printer from this information is often beyond the user's ability; the user is forced to call for assistance.

SUMMARY OF THE INVENTION

An object of the present invention is to provide an image processing apparatus or printer, and a method of installing its control program or driver, such that the image processing apparatus can be easily used from a host apparatus through a network, even when used by the host apparatus for the first time.

In the invented method of installing an image processing apparatus control program, a printer address indicating a location of an image processing apparatus on a network, apparatus identifying information identifying the image processing apparatus, a server address of a driver server storing an image processing apparatus control program for control of image processing in the image processing apparatus, and a communication program for communicating with the driver server through the network are transferred from the image processing apparatus to a host apparatus operable to output at least image data and image processing commands to the image processing apparatus through the network.

The host apparatus runs the communication program and communicates with the driver server through the network.

The communication program, running on the host apparatus and communicating with the driver server, selects, from within the driver server, the image processing apparatus control program of the image processing apparatus identified by the apparatus identifying information.

The communication program then downloads the image processing apparatus control program that it has selected, installs the image processing apparatus control program in the host apparatus, and sets the printer address as the location on the network of the image processing apparatus controlled by the installed image processing apparatus control program.

Since the printer address, the apparatus identifying information, the server address, and the communication program are transferred from the image forming apparatus to the host apparatus, and the communication program selects the appropriate image processing apparatus control program from the driver server, downloads it and installs it in the host apparatus, even when the image processing apparatus is first used by a host apparatus through the network, the process is practically automatic and the user does not need to request assistance.

BRIEF DESCRIPTION OF THE DRAWINGS

In the attached drawings:

FIG. 3A shows an example of the title of an information file including information generated by the printer to be copied into the USB memory;

FIG. 3B shows exemplary information recorded in the information file;

FIG. 3C shows exemplary displayed icons of the information file and a communication program file recorded in the USB memory;

FIGS. 8A to 8C constitute a flowchart illustrating operations from the time the USB memory in the first embodiment, with information stored therein, is connected to the host computer to the time the printer become usable;

DETAILED DESCRIPTION OF THE INVENTION

Figure 1:
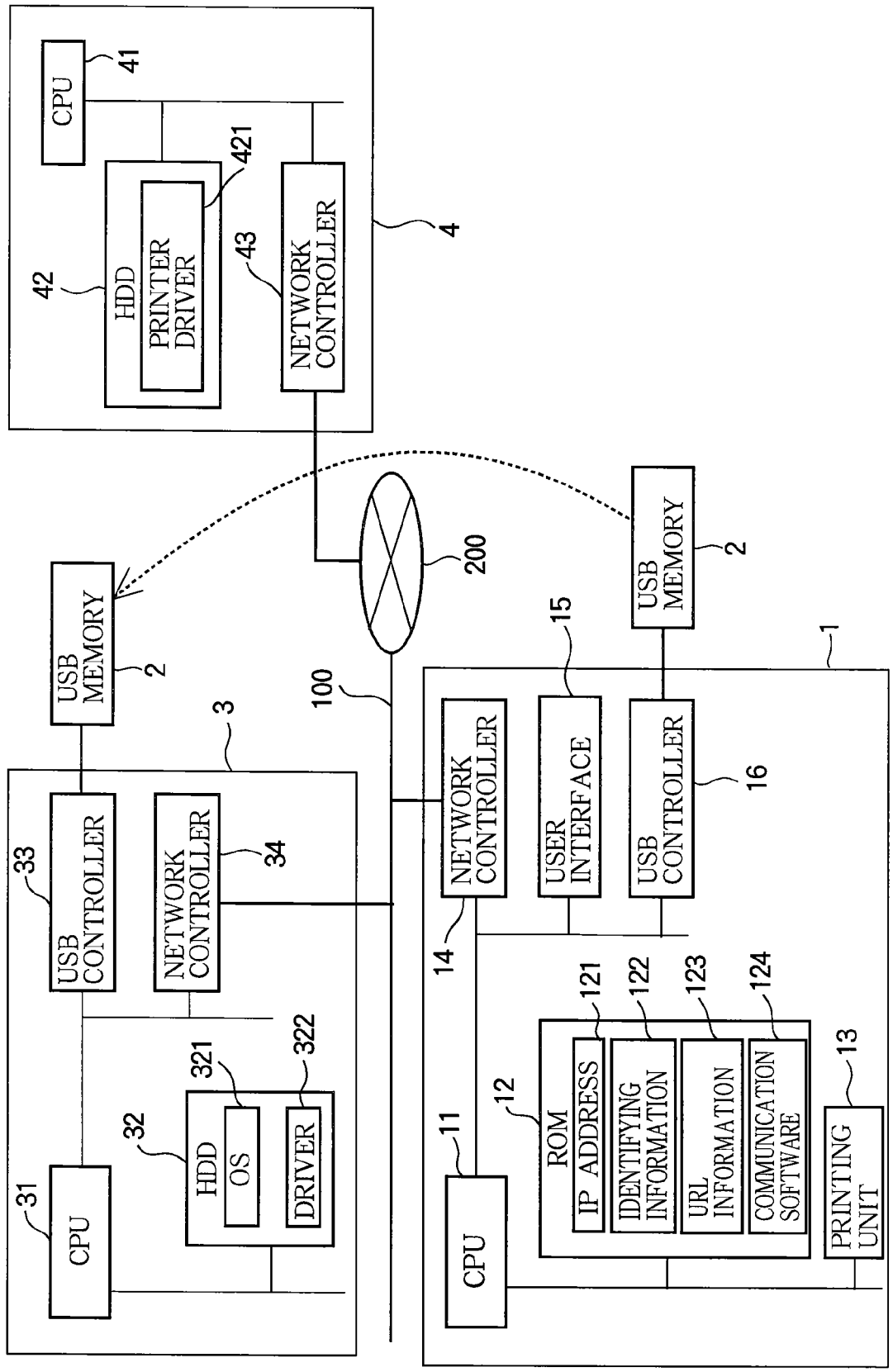
FIG. 1 is a schematic block diagram illustrating the structure of a printer according to a first embodiment of the present invention.

Embodiments of the invention will now be described with reference to the attached drawings, in which like elements are indicated by like reference characters. In the drawings, angle brackets (<. . . >) are used to represent arbitrary parameter values. For example, <IP ADDRESS> represents an arbitrary IP address.

The following description mentions several registered trademarks. Windows is a registered trademark of Microsoft Corporation, PostScript is a registered trademark of Adobe Systems, Incorporated, and PCL is a registered trademark of Hewlett-Packard Company.

First Embodiment

Referring to FIG. 1, a printer 1, which is connectable to a network and has a universal serial bus (USB) interface and a USB port, is installed on a local area network (LAN) 100 described below.

A USB memory 2 comprising a detachable and portable semiconductor memory, generally called a USB memory stick, is connectable to the USB port of the printer 1 as an external memory (auxiliary memory). The USB memory 2 is also connectable to a USB port of a host personal computer (PC) 3. The printer 1 and host PC 3 use their USB ports for input and output of data. The host PC 3 is also connectable to the local area network 100 and operates as a host apparatus of the printer 1 by outputting image processing commands to the printer 1 through the local area network 100 as described below. A driver server 4 stores printer driver software for the printer 1 and other printers. The driver server 4 is connected to a wide area network 200 to which the local area network 100 is also connected. The wide area network 200 comprises public telecommunication lines such as copper telephone lines and optical fibers, and may form part of the Internet.

The printer 1 comprises a central processing unit (CPU) 11 for controlling the other internal units of the printer 1 so as to print input image data, after first processing the data in accordance with various printing settings. The other internal units include a read-only memory (ROM) 12 for storing various information concerning the printer and storing communication software for obtaining and installing printer driver software via a communication line, a printing unit 13 for printing images based on input image data, a network controller 14 for sending and receiving data and commands to and from the local area network 100, thereby enabling communication between the printer 1 and the host PC 3, a user interface 15 including an input unit, such as a keypad or a touch panel, for receiving commands and information from a user, and a display unit, such as a display panel, for displaying messages and input confirmation, and a USB controller 16 that operates as the USB interface and controls communication with the USB memory 2.

The ROM 12 comprises an IP address section 121, which is a memory area for storing an IP address (printer address) specifying a location assigned to the printer 1 under the Internet Protocol (IP), an apparatus identifying information section 122, which is a memory area for storing information identifying the printer 1, such as the model name of the printer 1, and will be referred to as a model name section below, a server address information section 123, which is a memory area for storing a server address (URL) specifying the network location of the driver server 4 storing the printer driver of the printer 1, and a communication software section 124, which is a memory area for storing a communication program that runs on the host PC 3.

Figure 2A:
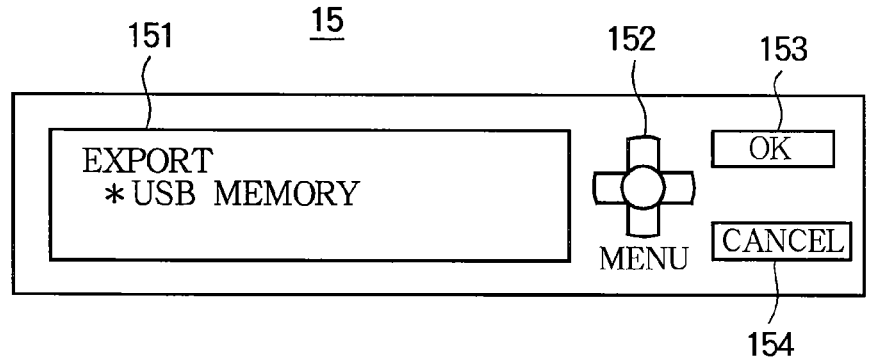
FIG. 2A is a top view illustrating the more detailed structure of the user interface of the printer in FIG. 1.
Figure 2B:
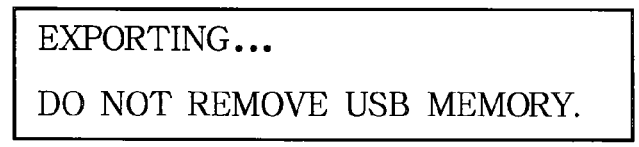
FIGS. 2B to 2E illustrate information displayed on the display unit of the user interface at various processing stages.
Figure 2C:
Figure 2D:
Figure 2E:

FIG. 2A illustrates the more detailed structure of the user interface of the printer 1 in FIG. 1. The user interface 15 comprises an input device such as a keypad or touch panel (not shown) that the user uses to enter commands or data, a display unit 151, which is a screen that displays information to the user and provides confirmatory feedback for user operations, a menu navigation button 152 that the user uses to proceed to a preceding or following menu display and select options with a cursor, an OK button 153 that the user uses to execute the option selected by the cursor on a menu display, and a cancel button 154 that the user uses for redoing or canceling input. FIG. 2B shows a message displayed on the display unit 151 when data are being output to the USB memory. FIG. 2C shows a message displayed on the display unit 151 when the output of data to the USB memory has been completed. FIG. 2D shows a message displayed on the display unit 151 when data cannot be output to the USB memory due to an IP address error. FIG. 2E shows a message displayed on the display unit 151 in the ordinary condition when data are not being output to the USB memory.

The host PC 3 in FIG. 1 comprises a central processing unit (CPU) 31, a hard disk drive (HDD) 32, a USB controller 33, and a network controller 34. The CPU 31 operates as a controller that controls the other sections of the host PC 3. In particular, the CPU 31 can execute a communication program transferred from the communication software section 124 in the printer 1 via the USB memory 2 to download and install a printer driver for the printer 1, and then execute the printer driver to have the printer 1 print documents or other images. The hard disk drive 32 is a large non-volatile memory that stores, among other things, the operating system (OS) for the host PC 3 and drivers for various peripheral units, including printers. The USB controller 33 operates as a USB interface for the USB memory 2 and controls communication with the USB memory 2 when the USB memory 2 is connected to the host PC 3. The network controller 34 operates as a network interface for sending and receiving data and commands to and from the local area network 100 to communicate with the printer 1, the driver server 4, and possibly other devices (not shown)

The hard disk drive 32 comprises an OS section 321, which is used as a memory area for storing the operating system of the host PC 3, and a driver section 322, which is used as a memory area for storing control programs (e.g., drivers) for peripheral devices, including the printer 1.

The driver server 4 in FIG. 1 comprises a CPU 41, a hard disk drive 42, and a network controller 43. The CPU 41 operates as a controller by controlling the other units of the driver server 4; for example, when the driver server 4 is accessed by the URL stored in the server address information section 123 in the printer 1, and the CPU 41 receives the model name stored in the model name section 122, the CPU 41 retrieves a printer driver corresponding to the printer model name from the hard disk drive 42 and sends the printer driver to the host PC 3 through the network controller 43. The network controller 43 sends and receives data and commands to and from the local area network 100 when the driver server 4 communicates with the printer 1 or host PC 3.

The hard disk drive 42 comprises a printer driver section 421, which is used as a memory area for storing printer drivers for a plurality of printers, including the printer 1 in FIG. 1. The printer driver section 421 may store not only the latest versions of the printer drivers, but all versions, accumulating new versions as the printer drivers are upgraded.

In this the first embodiment, a printer driver is installed by use of an external memory, specifically the USB memory 2, which is portable and attachable to both the printer 1 and the host PC 3.

Briefly, before the user of the host PC 3 uses the printer 1 for the first time, since the host PC 3 may not have the necessary printer driver, the USB memory 2 is inserted into the USB port and thereby connected to the USB controller 16 of the printer 1. This is the first step in installing the latest version of the printer driver in the host PC 3. When the USB memory 2 is connected to the printer 1, the CPU 11 and the USB controller 16 in the printer 1 export the information in the IP address section 121, model name section 122, and server address information section 123 in the ROM 12, and the communication program in the communication software section 124, into the USB memory 2. The communication program may be exported as a file named 'DrvInstaller.exe', for example, and the other information as a file named 'Install.ini'; these file names will be used in the description below. An export command may be input from the user interface 15. Specifically, after inserting the USB memory 2, the user may select an 'Export' command displayed on the display unit 151; when the user finalizes this selection with the OK button 153, the printer 1 starts copying the communication program and other information into the USB memory 2. When the copying is completed, the user removes the USB memory 2, thereby disconnecting it from the USB controller 16.

Next, the user inserts the USB memory 2 with the copied communication program and information file into the USB port of the host PC 3, thereby connecting it to the USB controller 33. The CPU 31 and the USB controller 33 in the host PC 3 now import the information file (Install.ini) and communication program file (DrvInstaller.exe) by copying them from the USB memory 2 into the hard disk drive 32. The communication program (DrvInstaller.exe) stored in the hard disk drive 32 is then executed. The communication program operates as an installer program for the printer driver: it checks whether or not the host PC 3 already has a printer driver for the printer 1; it downloads the printer driver for the printer 1 from the driver server 4 by communication via the networks 100, 200, using the data in the information file (Install.ini); and it installs the printer driver in the host PC by making necessary settings.

Next, the installation of the printer driver in the host PC 3 will be described in more detail, with reference to the flowcharts in FIGS. 7A to 7C and 8A to 8C.

Figure 7A:
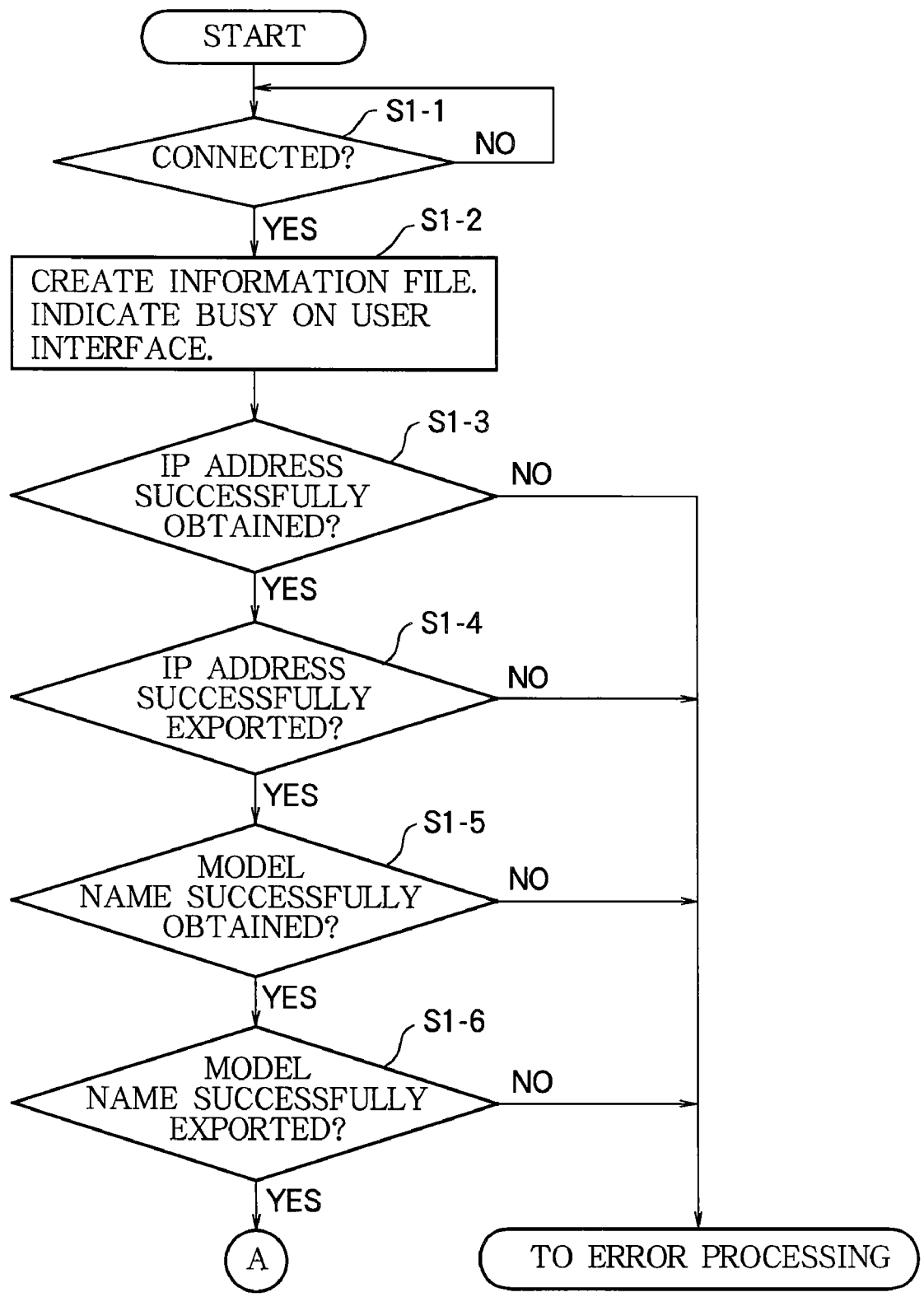
FIGS. 7A to 7C constitute a flowchart of operations from the time the USB memory in the first embodiment is connected to the printer to the time it is disconnected.
Figure 7B:
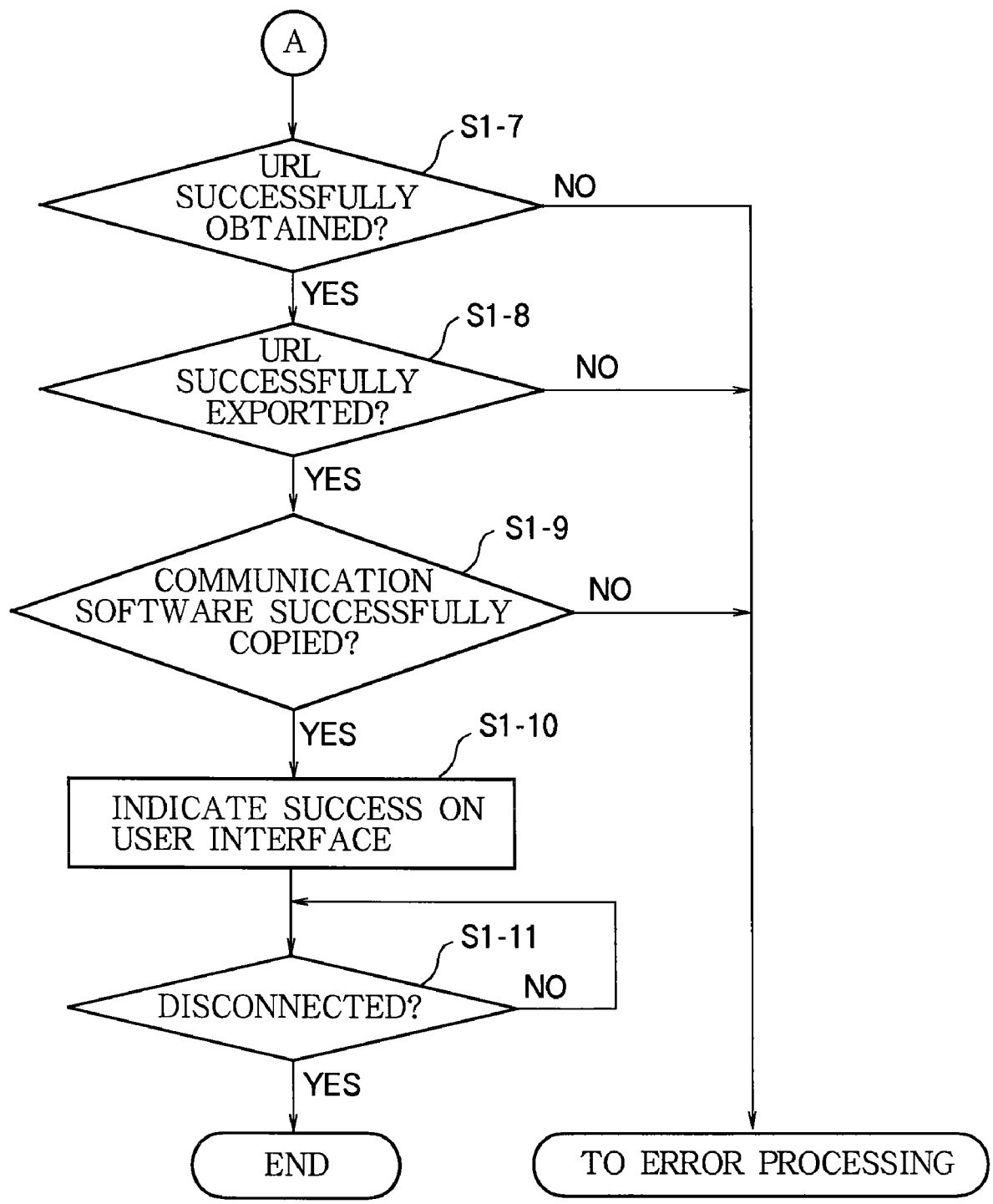
Figure 7C:
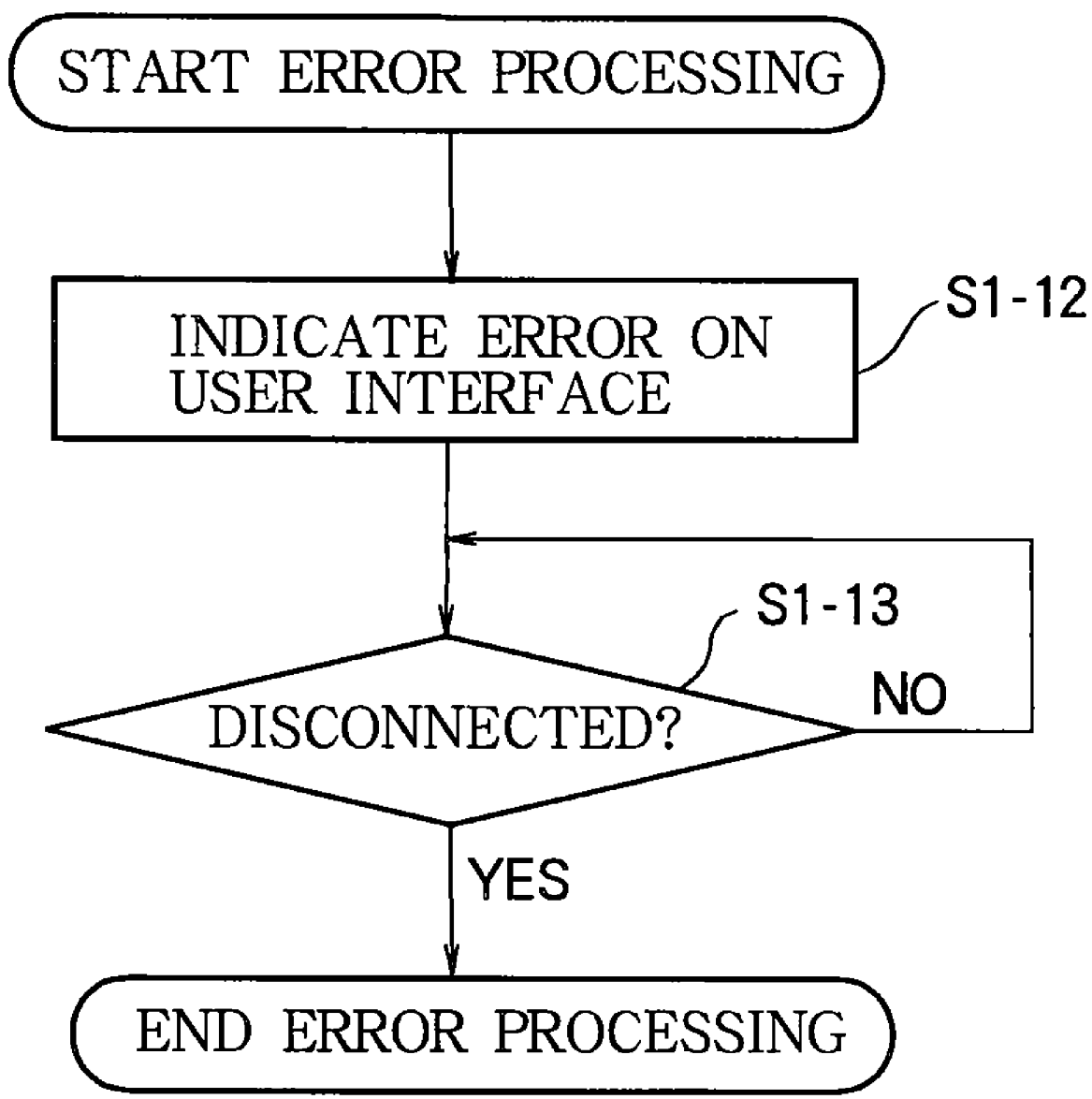

FIGS. 7A to 7C illustrate the process of exporting the communication program and other information from the printer 1 to the USB memory 2. The user connects the USB memory 2 to the printer 1 and executes an export command displayed on a menu on the display unit 151 of the user interface 15 by using the menu navigation button 152, OK button 153, and cancel button 154, causing the printer 1 to copy the communication program and other information from the ROM 12 to the USB memory 2; then the user removes the USB memory 2, which now stores the necessary information. The export of information to the USB memory 2 in this embodiment requires the creation of an information file to store the model name and IP address of the printer 1 and address of the driver server 4 in the USB memory 2 while it is connected to the printer 1, the copying of information into this file, and the copying of the separate communication program (the DrvInstaller.exe file) that installs a printer driver in the host PC 3.

To begin the procedure in FIGS. 7A to 7C, the printer 1 detects whether or not the USB memory 2 is connected to the printer 1 (step S1-1 in FIG. 7A). When the USB memory 2 is connected, the printer 1 recognizes the connection by receiving an export request from the USB memory 2 via the USB controller 16. The user can also see that the connection has been made, because the display on the display unit 151 of the user interface 15 changes from the screen shown in FIG. 2E to the screen shown in FIG. 2A.

If the connection has not been made (No in step S1-1), the printer 1 repeats step S1-1 until a connection is confirmed. When the USB memory 2 is not properly connected, the user can see this because the display on the display unit 151 of the user interface 15 does not change.

When the USB memory 2 has been successfully connected (Yes in step S1-1), the printer 1 detects the connection, creates an information file (Install.ini) in the USB memory 2, and displays a menu showing that data are to be exported and that '*USB memory' can be selected as an output. The user selects '*USB memory' using the menu navigation button 152, if necessary, and presses the OK button 153. The printer 1 detects the command to export the file to the USB memory, and begins the export process.

FIG. 3A shows an exemplary title line in the information file (Install.ini); FIG. 3B shows exemplary information recorded in the Install.ini file; FIG. 3C shows examples of the icons displayed for the Install.ini file and the communication program file after they are stored in the USB memory.

To begin the export to the USB memory, the CPU 11 and USB controller 16 in the printer 1 create the Install.ini file shown in FIG. 3A as an information file in the USB memory 2, with '[Printer]' as a section heading. The display unit 151 of the user interface 15 now displays a cautionary message such as 'Exporting . . . Do not remove USB memory' as shown in FIG. 2B, to warn the user not to remove the USB memory 2 because the information file is being copied to the USB memory (step S1-2 in FIG. 7A).

The procedure of exporting information to the USB memory comprises both creating an information file containing the model name and IP address of the printer 1 and the address of the driver server in the USB memory connected to the printer 1, and copying the communication software for installation of the printer driver in the host PC into the USB memory.

When the information file (Install.ini file) has been created in the USB memory 2, the IP address assigned to the printer 1 is obtained by reading it from the IP address section 121 in the ROM 12, and the printer 1 determines whether or not the IP address has been successfully obtained (step S1-3).

If the IP address is successfully obtained from the IP address section 121 (Yes in step S1-3), the printer 1 writes the obtained IP address following the 'IPAddress=' key in the Printer section of the Install.ini file, as shown in FIG. 3B. The printer 1 then reads the file to determine whether or not the IP address has been successfully exported (step S1-4). If the IP address has not been successfully written (No in step S1-4) or was not successfully obtained from the IP address section 121 (No in step S1-3), the printer 1 executes error processing. If the export is successful, the obtained IP address, e.g., '194.128.010.011' appears following the 'IPAddress=' key in FIG. 3B.

If the IP address is successfully exported (Yes in step S1-4), the model name of the printer 1 is obtained by reading it from the model name section 122 in the ROM 12, and the printer 1 determines whether or not the model name has been successfully obtained (step S1-5).

If the model name is successfully obtained from the model name section 122 (Yes in step S1-5), the printer 1 writes the obtained model name, e.g., 'PR1550C', following the 'Model=' key in the Printer section of the Install.ini file shown in FIG. 3B, and reads the file to determine whether or not the model name has been successfully exported (step S1-6). If the model name is not successfully exported (No in step S1-6 or S1-5), the printer 1 executes error processing.

If the model name is successfully exported (Yes in step S1-6), the URL information that specifies the location on the Internet (address) of the driver server 4 that stores the driver program of the printer 1 is obtained by reading it from the server address information section 123 in the ROM 12, and the printer 1 determines whether or not the URL has been successfully obtained (step S1-7 in FIG. 7B).

If the URL is successfully obtained (Yes in step S1-7), the printer 1 writes the obtained URL, e.g., 'http://www.company.com/download/' followed by '¥Drivers' after the 'Location=' key in the Printer section of the Install.ini file shown in FIG. 3B, and reads the file to determine whether or not the URL has been successfully exported (step S1-8) If the URL has not been successfully exported (No in step S1-8 or S1-7), the printer 1 executes error processing.

If the URL is successfully exported (Yes in step S1-8), the communication program (DrvInstaller.exe) stored in the communication software section 124 in the ROM 12 is copied to the USB memory 2, and the printer 1 determines whether or not the copying operation has been successful (step S1-9). The DrvInstaller.exe program will be described later with reference to FIG. 5A.

If the communication program in the communication software section 124 is successfully copied to the USB memory 2 (Yes in step S1-9), the display unit 151 of the user interface 15 of the printer 1 indicates that the export has been successfully completed (that is, the information has been successfully written in the USB memory), and that the USB memory can now be removed, as shown in FIG. 2C (step S1-10). The information written in the USB memory 2 is stored as a pair of files in the USB memory, having the file names 'DrvInstaller.exe' for the communication program file copied from the printer 1 and 'Install.ini' for the information file created in the printer 1. In this embodiment, the files are created in the root directory of the USB memory. Alternatively, a new directory such as 'PR1550C' can be created and the files can be stored in this new directory. If the communication program has not been successfully copied from the communication software section 124 to the USB memory 2 (No in step S1-9), the printer 1 executes error processing.

Using the USB controller 16, the printer 1 now determines whether the connection of the USB memory 2 that was confirmed in step S1-1 has been terminated by the user, that is, whether the USB memory 2 has been removed from the printer 1 (step S1-11). If the connection has been terminated (Yes in step S1-11), the printer 1 ends the process; otherwise (No in step S-11), the printer 1 repeats step S1-11 until the user terminates the connection of the USB memory 2.

The message shown in FIG. 2C does not change during the repetitions of step S1-11. When the user notices this message, realizes that the USB memory 2 is still connected, and disconnects the USB memory 2 by removing it, immediately after the disconnection, the display unit 151 reverts to the 'Online' screen shown in FIG. 2E.

When error processing is necessary, the printer 1 executes steps S1-12 and S1-13 in FIG. 7C. In step S1-12, if the error processing follows a negative determination in step S1-3, the display unit 151 of the user interface 15 notifies the user by a message such as the one in FIG. 2D; if the error processing follows a negative determination in step S1-4, the display unit 151 displays a message indicating that the IP address could not be exported; if the error processing follows a negative determination in one of steps S1-5 to S1-9, the display unit 151 displays a corresponding message indicating that the model name could not be obtained (step S1-5) or exported (step S1-6), the URL could not be obtained (step S1-7) or exported (step S1-8) or the communication program could not be copied (step S1-9).

After the display of one of these error messages in step S1-12, in step S1-13, using the USB controller 16, the printer 1 determines whether the connection of the USB memory 2 established in step S1-1 has been terminated by the user, that is, whether the user has removed the USB memory 2 from the printer 1.

If the connection has been terminated (Yes in step S1-13), the printer 1 ends the processing; otherwise (No in step S1-13), the printer 1 repeats the determination in step S1-13 until the user disconnects the USB memory 2.

The display unit 151 continues to display the error message displayed in step S1-12 until the user notices the message and disconnects the USB memory 2 by removing it. Immediately after the disconnection, the display reverts to the 'Online' screen shown in FIG. 2E.

Figure 4A:
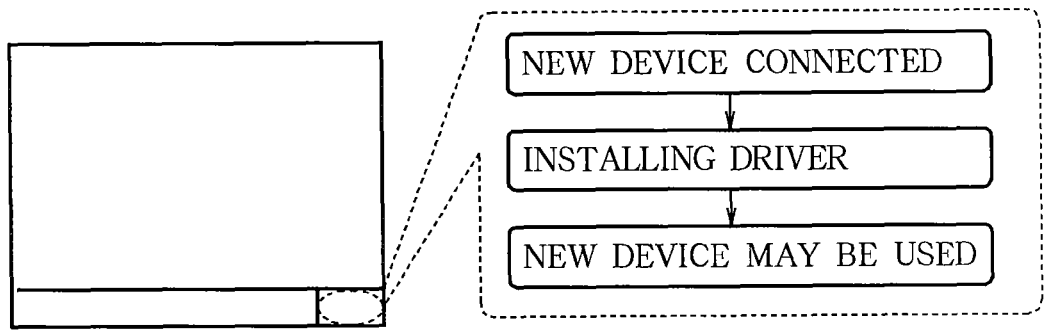
FIGS. 4A to 4D show information displayed by a plug-and-play function on the host computer.
Figure 4B:
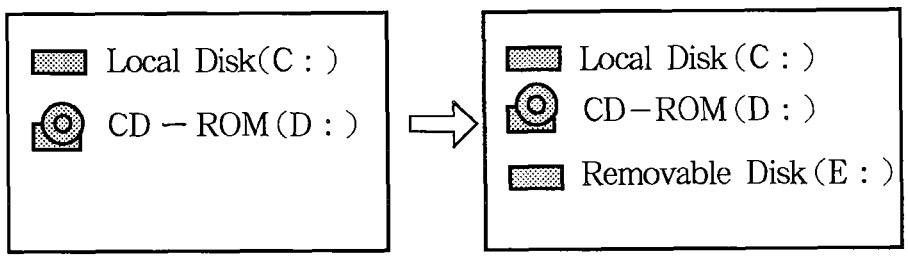
Figure 4C:
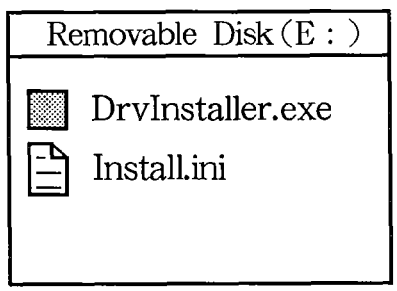
Figure 4D:
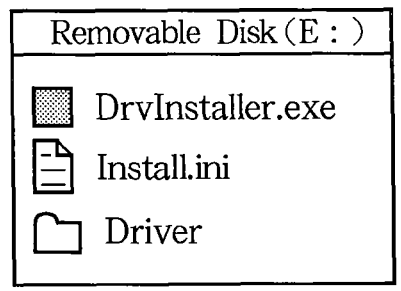

In the first embodiment, the USB memory in which the above information files have been created is removed from the printer 1 and inserted in the USB port in the host PC 3. If the host PC 3 is running the Windows operating system, the Windows plug-and-play function responds to the insertion of the USB memory 2 as shown in FIGS. 4A to 4D. FIG. 4A shows information displayed when the USB memory 2 is recognized as a mass storage device; FIG. 4B shows hardware configuration information displayed before and after the USB memory 2 is recognized as a mass storage device, designated a 'removable disk' because it is accessed in much the same way as a rotating mass storage device; FIG. 4C shows how the contents of the USB memory 2 or 'removable disk' are displayed; FIG. 4D shows the same content display after the printer driver is downloaded by the communication program in the first embodiment.

When the USB controller 33 of the host PC 3 detects that the USB memory 2 has been connected and the plug-and-play function has 'installed' the USB memory 2 as indicated in FIG. 4A to make it available for use, the plug-and-play function updates the display of storage icons on the host PC 3 to indicate that a removable disc (E:) has been added as shown in FIG. 4B. The driver section 322 of the host PC 3 includes a USB mass storage device driver. If the user selects and opens the removable disk (E:) on the display shown at right in FIG. 4B, icons indicating the DrvInstaller.exe and install.ini files stored in the USB memory 2 are displayed as shown in FIG. 4C. When the printer driver of the printer 1 is downloaded, it is first stored in the USB memory 2 and a 'Driver' file icon is added as shown in FIG. 4D.

Figure 5A:
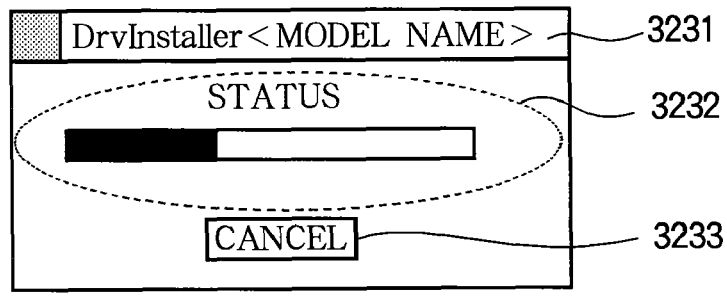
FIGS. 5A to 5D show exemplary windows displayed while the communication program is operating or being installed.
Figure 5B:
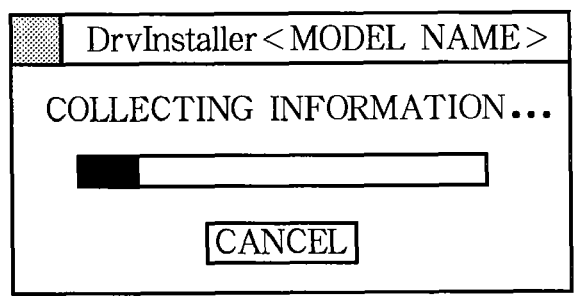
Figure 5C:
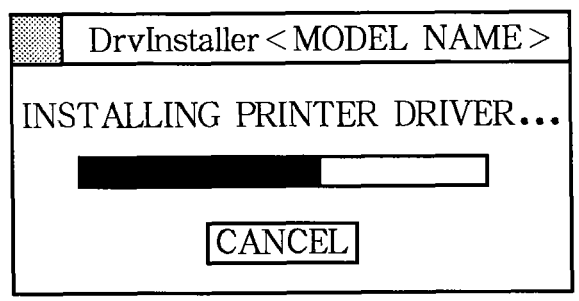
Figure 5D:
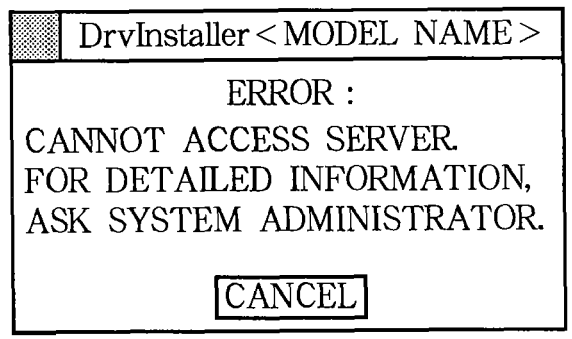

FIG. 5A shows a display that indicates the progress of the process of installing the communication program itself; FIG. 5B shows how the communication program displays its processing status while collecting information after starting to operate; FIG. 5C shows how the communication program displays its processing status while installing the printer driver; and FIG. 5D shows how the communication program displays its processing status if an error occurs during access- to the server after the communication program starts operating.

The communication program (DrvInstaller.exe) will now be described. The main functions of this program are to collect printer driver information pertaining to the printer 1 as shown in FIG. 5B, and install a printer driver for the printer 1 in the host PC 3 as shown in FIG. 5C. The communication program itself is installed in the host PC 3 as indicated in FIG. 5A when the USB memory 2 is connected to the host PC 3.

The DrvInstaller.exe program operates as follows. When DrvInstaller.exe is being installed in the host PC 3, as shown in FIG. 5A, the model name 3231 of the printer 1 is displayed in the title bar of the display on the host PC 3, an installation progress status bar 3232 is displayed beneath the model name 3231, and a cancel button 3233 for stopping the installation process is displayed at the bottom.

Once installed in the host PC 3, the DrvInstaller.exe communication program operates as follows. Based on the information in the Install.ini file, the DrvInstaller.exe program automatically initiates communication with the driver server 4 to collect printer driver information pertaining to the printer 1 as shown in FIG. 5B, automatically downloads a printer driver for the printer 1, and installs the downloaded printer driver in the printer 1 as shown in FIG. 5C.

If an error occurs during the collection of printer driver information for the printer 1, the occurrence of the error and its cause (e.g., failure to access the server) are reported to the user as shown in FIG. 5D.

Figures 6A, 6B, 6C:
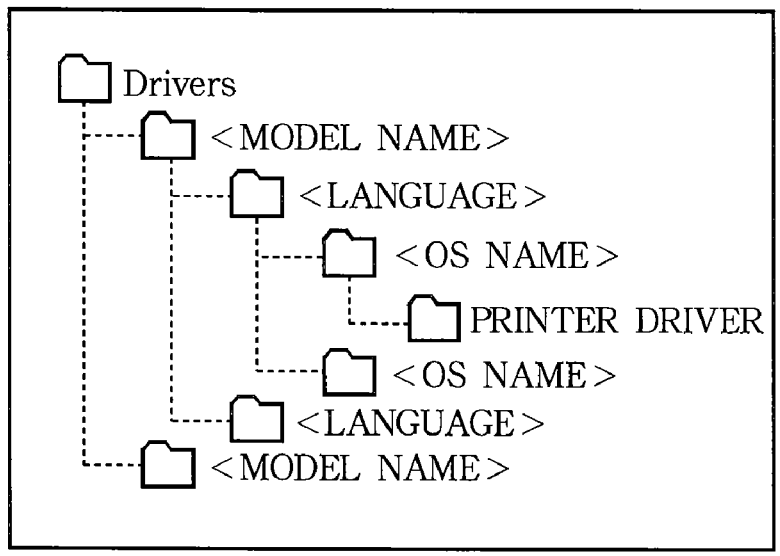
FIG. 6A is a display showing how printer drivers are stored in a driver server.
FIG. 6B is a table of operating system versions and their identifiers.
FIG. 6C is a table of locale identifiers and language identifiers.

FIG. 6A illustrates the tree structure of the folders in which printer drivers are stored in the driver server. FIG. 6B is a table of Windows operating system versions and their corresponding OS identifiers. FIG. 6C is a table listing some of the main locale identifiers (IDs) supported by Windows, and their corresponding language identifiers.

As shown in FIG. 6A, the printer driver corresponding to the printer is selected by the model name of the printer and the language (locale ID) and OS version used in the host PC 3. In the configuration shown in FIG. 6A, folders for different model names, languages, and OS names are stored in a tree structure. The user can reach the intended printer driver by selecting the relevant names one by one in this order. The Windows operating system has a plurality of versions, each requiring different printer drivers, so a printer driver compatible with the Windows version of the host PC 3 must be used. The different OS versions have corresponding identifiers as shown in FIG. 6B. Also, even for the same OS version, different languages have different printer drivers. The locale ID identifies a language, country, and region. This is necessary because one language may be used in a plurality of countries, or a plurality of languages may be used in one country. The language, which is also identified by a language identifier as shown in FIG. 6B, is the language in which information is displayed by the operating system.

Next, the installation of a printer driver according to the first embodiment will be described in detail with reference to the flowchart in FIGS. 8A to 8C.

Figure 8B:
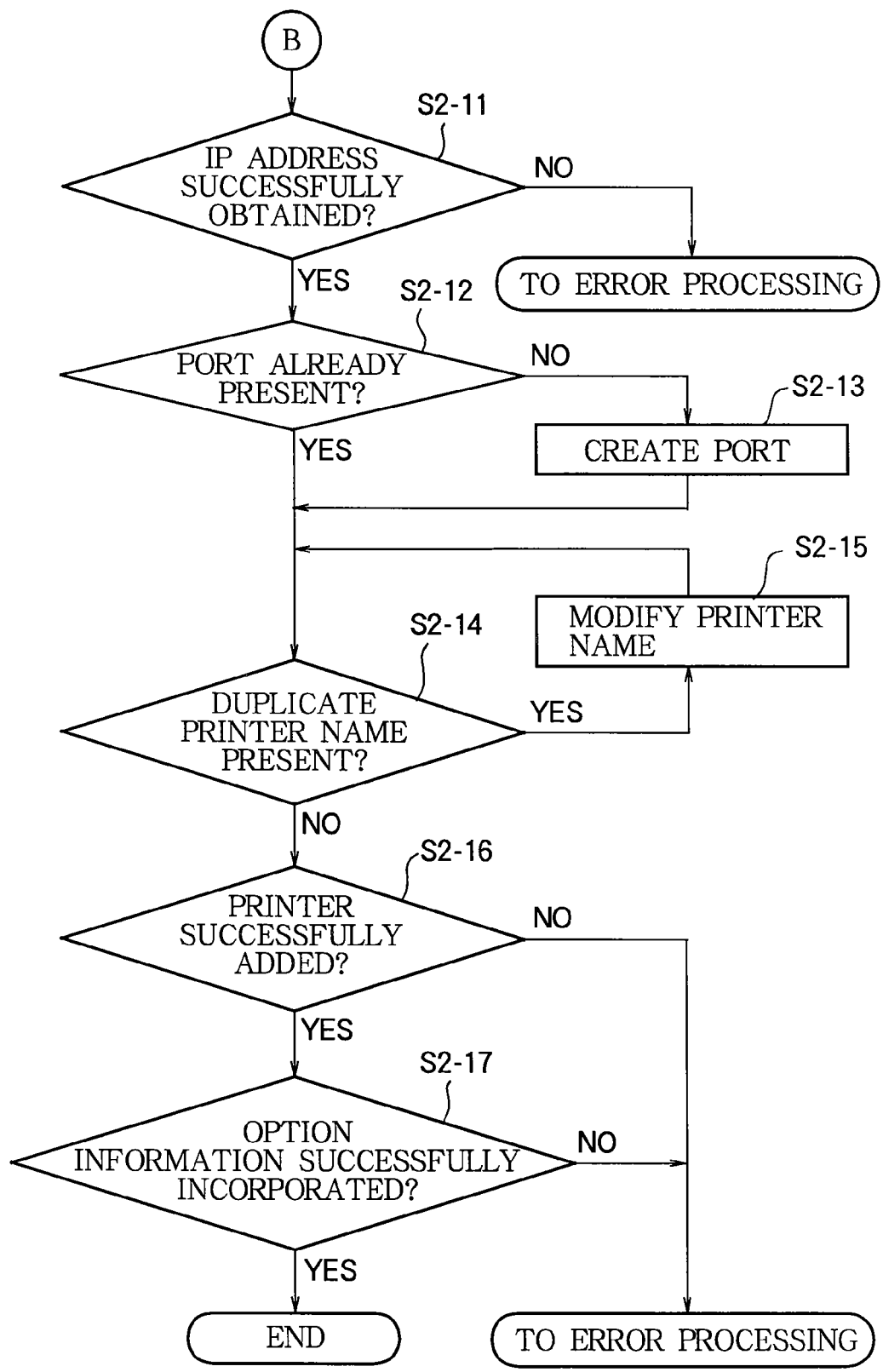
Figure 8C:
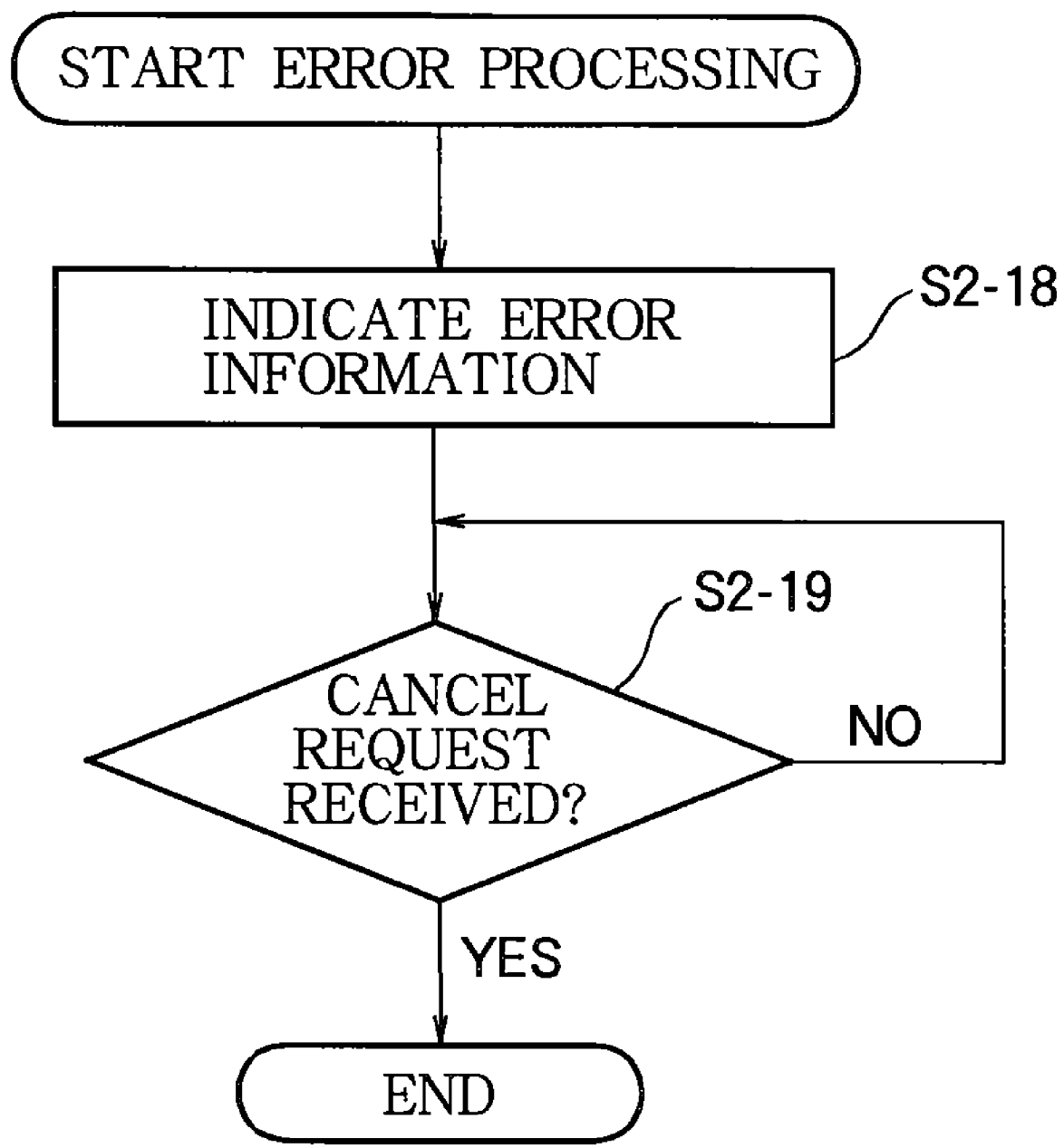

The operations shown in FIGS. 8A to 8C are carried out when the user runs the communication program stored in the USB memory 2 connected to the host PC 3. The communication program DrvInstaller.exe is first imported to the host PC 3 from the USB memory 2 and installed in the host PC 3. When run on the host PC 3, the communication program communicates with the driver server 4 by using the information in the Install.ini file, collects printer driver information relevant to the printer 1, downloads a printer driver for the printer 1, automatically installs the printer driver in the host PC 3, again using the information in the Install.ini file, and notifies the user if an error occurs during the processing.

When the host PC 3 recognizes the USB memory 2 as a USB mass storage device, the information on the right in FIG. 4A is displayed as a pop-up menu. When the USB mass storage device becomes available for use as a removable disk (E:), an icon indicating this is displayed on the display screen of the host PC 3 as shown in FIG. 4B. When the removable disk (E:) is opened, either automatically or by a selection by the user, and the user selects the DrvInstaller.exe file from, for example, the display shown in FIG. 4C, the host PC 3 starts the DrvInstaller.exe program, processing status is displayed on the host PC 3 as shown in FIG. 5A, and the installation process begins (step S2-1 in FIG. 8A).

In the installation process, first the OS version of the host PC 3 is obtained from the OS section 321 of the hard disk drive 32, and the OS version stored in the OS section 321 is converted to an identifier based on the table in FIG. 6B. For example, if the operating system stored in the OS section 321 is Windows XP, the identifier 'Win2kXP' is obtained (step S2-2).

When the OS version has been converted to an identifier, the locale ID of the host PC 3 is obtained from the OS section 321 and converted to an identifier identifying the system language based on the table in FIG. 6C. For example, if the locale ID stored in the OS section 321 is '1041' indicating the Japanese language, the identifier is 'JPN' (step S2-3).

When the locale ID has been converted to an identifier, the model name string following the 'Model=' key in the Printer section of the Install.ini file is read, and whether or not the name has been successfully obtained is determined (step S2-4). If the model name has not been successfully obtained (No in step S2-4), the host PC 3 executes error processing as described below.

When the model name string has been successfully obtained (Yes in step S2-4), the host PC 3 reads the server address string following the 'Location=' key in the Printer section of Install.ini, and determines if the name has been successfully obtained or not (step S2-5). If the name has not been successfully obtained (No in step S2-5), the host PC 3 executes error processing as described below.

When the server address string has been successfully obtained (Yes in step S2-5), the host PC 3 operates on the server address string, based on the configuration of the driver server 4 as shown in FIG. 6A, to create an address string designating the location (printer driver section 421) in which the printer driver is stored. For example, if the operating system stored in the OS section 321 is the Japanese version of Windows XP, the address string is '<address of the driver server 4>¥Drivers¥<model name of printer 1>¥JPN¥Win2kXP' as shown in FIG. 6A (step S2-6).

When the address string has been created, the host PC 3 uses the created address and the network controller 34 to communicate with the driver server 4 via the networks 100, 200. Through communication with the driver server 4, the host PC 3 determines whether or not a printer driver for the printer 1 is stored in the driver server 4 (step S2-7). If no printer driver for the printer 1 is stored in the driver server 4 (No in step S2-7), the host PC 3 executes error processing as described below.

If a printer driver for the printer 1 is stored in the driver server 4 (Yes in step S2-7), the host PC 3 creates a 'Driver' folder in the USB mass storage device as shown in FIG. 4D, and determines if the folder has been successfully created (step S2-8). If the folder has not been successfully created (No in step S2-8), the host PC 3 executes error processing as described below.

When the folder is created successfully (Yes in step S2-8), the host PC 3 downloads the printer driver for the printer 1 from the printer driver section 421 of the driver server 4 using the address string, and determines whether or not the driver has been successfully downloaded (step S2-9). If the printer driver of the printer 1 is not successfully downloaded (No in step S2-9), the host PC 3 executes error processing as described below.

When the printer driver for the printer 1 has been successfully downloaded (Yes in step S2-9), the host PC 3 stores and registers the printer driver in the driver section 322 in the hard disk drive 32 of the host PC 3, and determines whether or not the driver has been successfully registered (step S2-10). If the printer driver has not been successfully registered (No in step S2-10), the host PC 3 executes error processing as described below.

When the printer driver has been successfully registered (Yes in step S2-10), the host PC 3 obtains the IP address string following the 'IPAddress=' key in the Printer section of the Install.ini file, and determines whether or not the IP address string has been successfully obtained (step S2-11). If the IP address string has not been successfully obtained (No in step S2-11), the host PC 3 executes error processing as described below.

When the IP address string is successfully obtained (Yes in step S2-11), the host PC 3 creates a printer port name string using the IP address (e.g., IP_<IP address>), and determines whether or not the same printer port name is already present (step S2-12). If a printer port name using the same IP address is not already present (No in step S2-12), the host PC 3 creates a port under the name given by the printer port name string, based on the IP address, and proceeds to the next step (step S2-13). The port type is the standard TCP/IP port type used in Windows (TCP/IP is an abbreviation of Transmission Control Protocol/Internet Protocol).

If a printer port name using the same IP address is already present (Yes in step S2-12), the host PC 3 obtains the printer name of the printer driver corresponding to the printer 1, from the information file of the printer driver contained in the printer driver file group in the printer driver section 421 of the driver server 4, in order to use the printer name of the downloaded printer driver of the printer 1 as the printer name after installation. After that, the host PC 3 determines if the obtained printer name is present or not in the OS section 321 of the hard disk drive 32 (step S2-14). If the same printer name is already present (Yes in step S2-14), the host PC 3 converts the obtained printer name to another name such as <printer driver name>(copy 1) (step S2-15). The host PC 3 repeats steps S2-14 and S2-15 until the printer name of the printer 1 is uniquely determined in the OS section 321 of the hard disk drive 32.

If the same printer name is not already present (No in step S2-14), the printer name of the printer driver can be used without change. The host PC 3 registers the printer 1 in the printer folder in the OS section 321 in the hard disk drive 32 using the printer model name given by the model name string following the 'Model=' key in the Printer section of the Install.ini file, the printer name as determined above, and the port name created as above, and determines whether or not the printer 1 has been successfully registered (step S2-16). If the printer 1 has not been successfully registered (No in step S2-16), the host PC 3 executes error processing as described below.

When the printer 1 is successfully registered (Yes in step S2-16), the host PC 3 communicates with the printer 1 using the registration information, obtains information about optional features of the printer 1 (e.g., a double sided printing unit and additional trays), incorporates this information into the registered printer driver, and determines whether or not the information has been successfully incorporated (step S2-17). If the information has not been successfully incorporated (No in step S2-17), the host PC 3 executes error processing as described below.

If the information has been successfully incorporated (Yes in step S2-17), the installation has been successfully completed. The host PC 3 then automatically terminates execution of the DrvInstaller.exe program.

When error processing is performed, the host PC 3 displays a message describing the error and explaining what action to take (step S2-18). If the error processing is performed because of a negative determination in step S2-4, the error message in FIG. 5D may be displayed. Generally similar messages are displayed when the error processing is performed because of a negative determination in one of steps S2-5 to S2-17.

Next, the host PC 3 determines whether or not the user has canceled the installation procedure by taking the action called for in the error message, e.g., removing the USB memory (step S2-19). If the user has taken the action (Yes in step S2-19), the host PC 3 ends the processing; otherwise (No in step S2-19), the host PC 3 repeats step S2-19 until the user takes the necessary action.

The above process enables the user to use any printer 1 just by inserting a USB memory 2 into the printer 1 to export a communication program and related information, then removing the USB memory 2 from the printer 1, inserting it into the host PC 3, and executing the communication program which is now stored in the USB memory 2.

After installing the printer driver for the printer 1 in the host PC 3 as described above, the user may install the same printer driver in other host PCs just by inserting the USB memory 2 into those PCs. Since a copy of the downloaded printer driver has been stored in the USB memory 2, as shown in FIG. 4D, if the other host PCs have the same OS version and language, it is not necessary to download the printer driver from the driver server 4 again.

Another feature of the first embodiment is that since the communication program, downloaded printer driver, and other data are stored in files in the USB memory 2, as shown in FIGS. 4C and 4D, they can be easily deleted if no longer needed after successful installation has been confirmed by execution of a printing job.

As described above, in the first embodiment, just by inserting the USB memory 2 into the printer 1 and then into the host PC 3 and starting the communication program, the user can install a printer driver for the printer 1 and set parameters in the installed printer driver, such as the printer port of the host PC 3 and options present in the printer 1. This process may be entirely automatic, or the user may be allowed to select actions from menus, but in either case, it is not necessary for the user to understand the technical details of the printer or carry out a complex installation procedure himself or herself. When the user uses a network printer from a network terminal for the first time, the user can do so without difficulty.

Second Embodiment

Figure 9A:
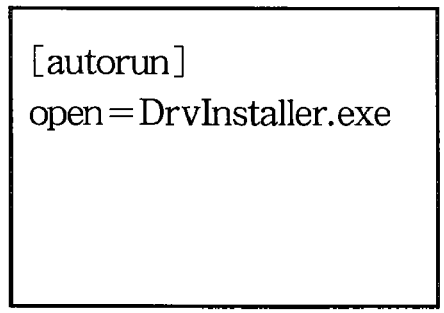
FIGS. 9A to 9C show software and icons added in a second embodiment of the invention.
Figure 9B:
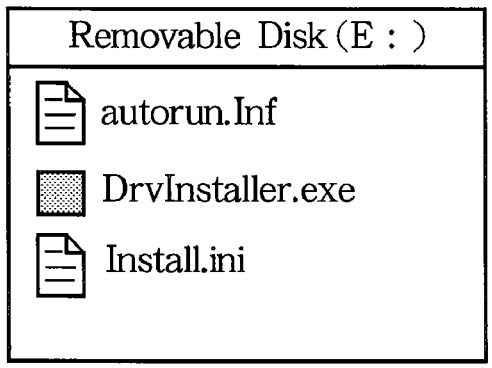
Figure 9C:
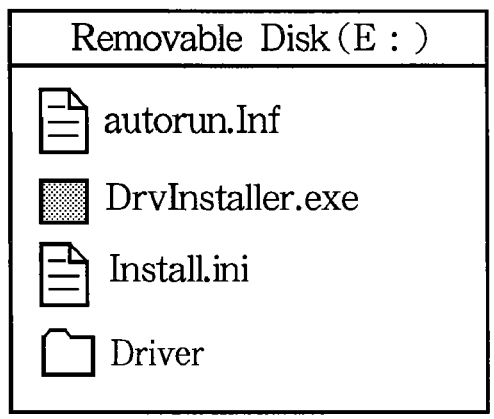

The second embodiment has the same general configuration as the first, but adds the autorun.inf program shown in FIG. 9A to the information exported to the USB memory in FIG. 1. The autorun.inf program automatically executes the DrvInstaller.exe program on the host computer. The autorun.inf file accordingly appears in the contents of the USB mass storage device before (FIG. 9B) and after (FIG. 9C) the printer driver is downloaded. FIGS. 9B and 9C replace FIGS. 4C and 4D in the first embodiment.

Figure 10A:
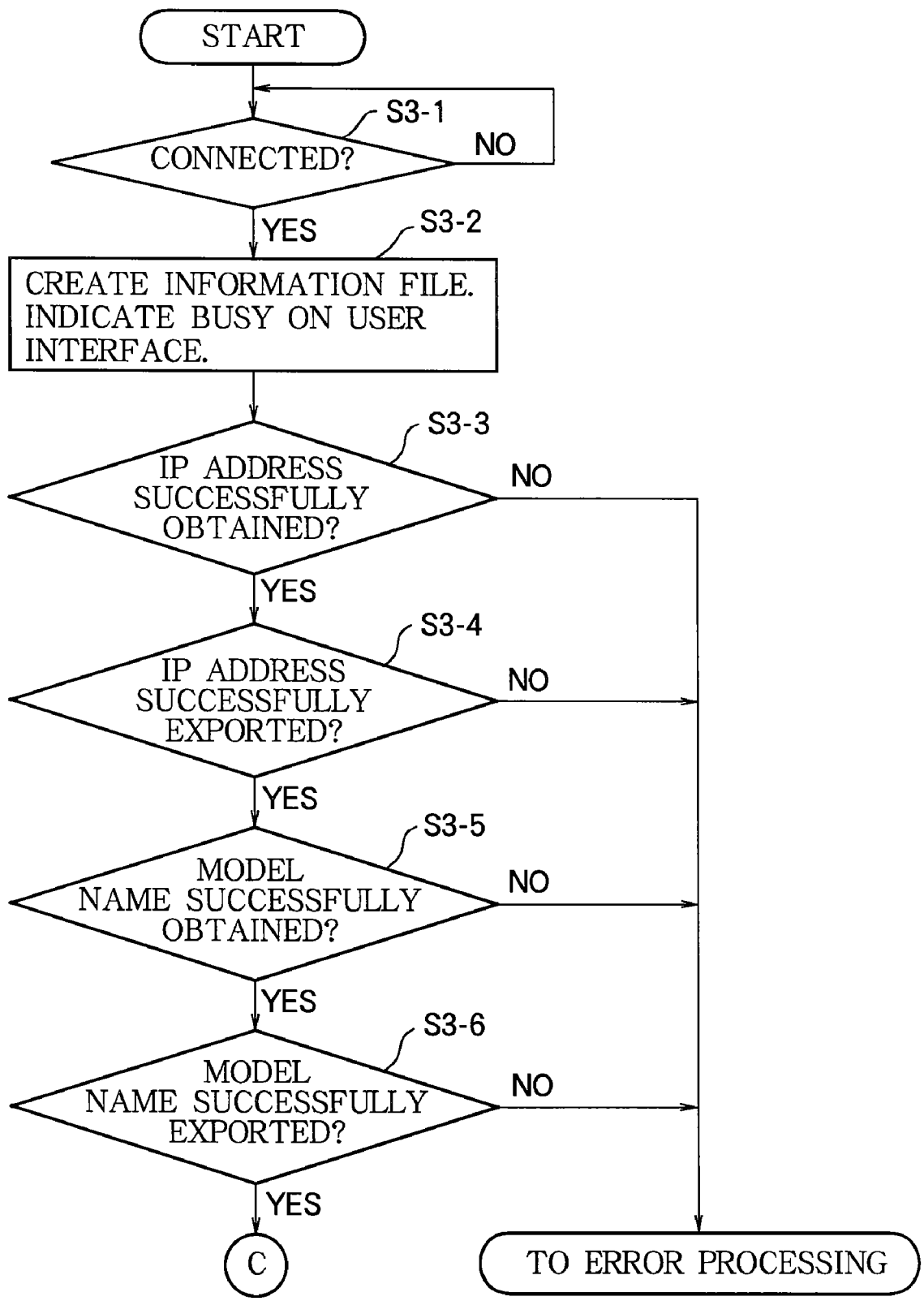
FIGS. 10A to 10C constitute a flowchart illustrating operations from the time the USB memory in the second embodiment is connected to the printer to the time it is disconnected.
Figure 10B:
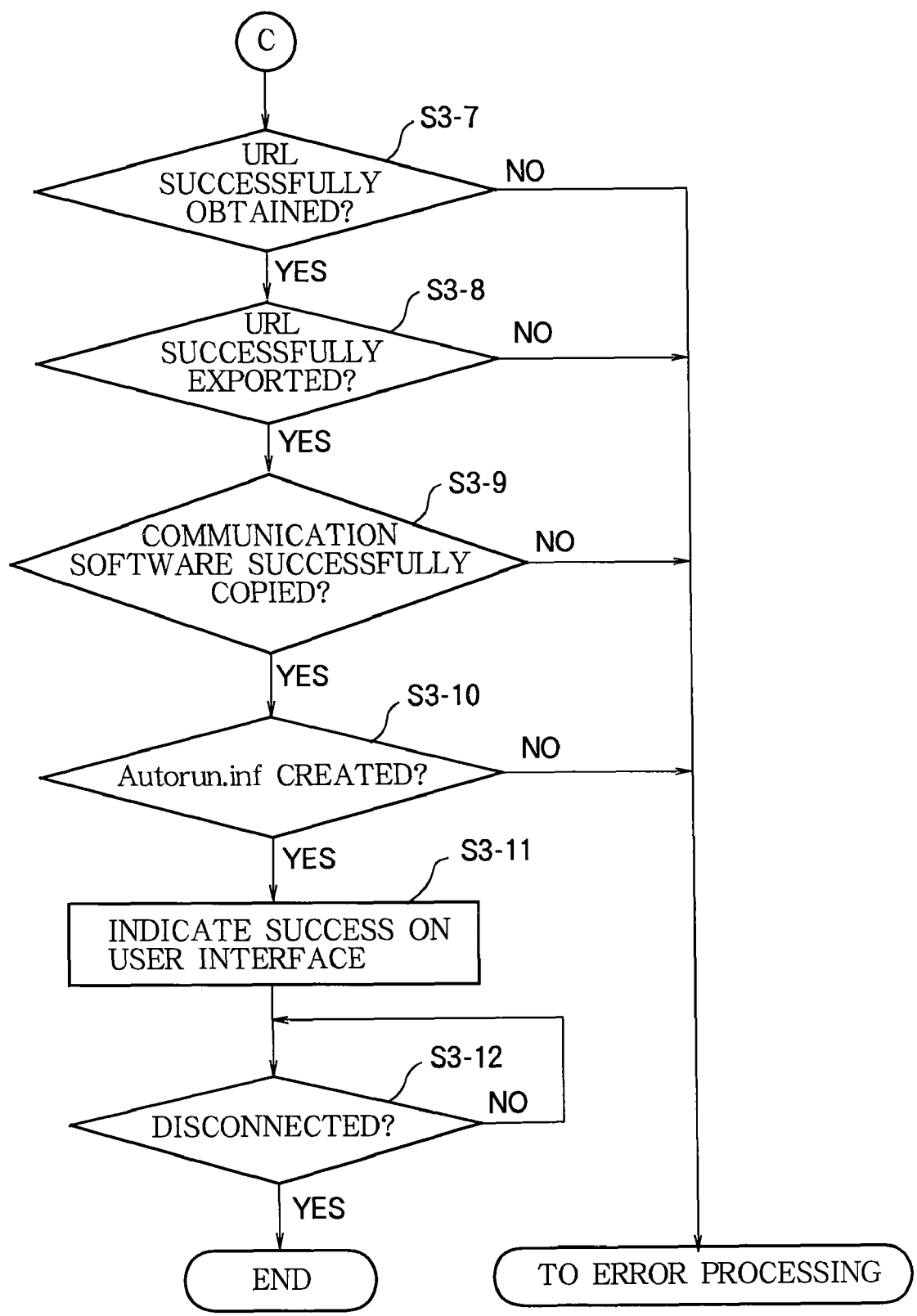
Figure 10C:
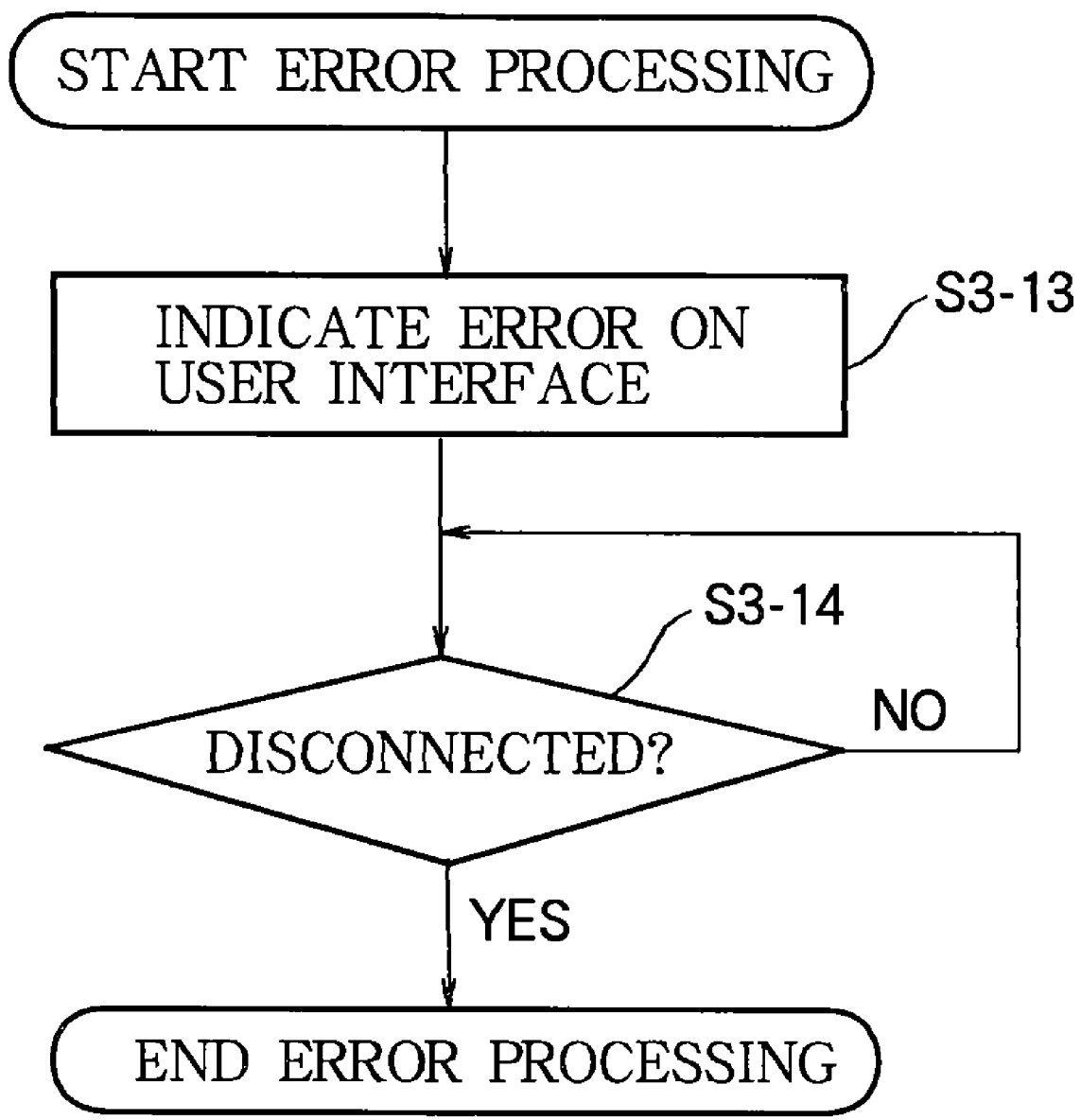

FIGS. 10A to 10C shows the operations carried out to install the driver for the printer 1 into the host PC 3 when the user uses the printer 1 from the host PC 3 for the first time. The user connects the USB memory 2 to the printer 1, operates the menu navigation button 152, OK button 153, and cancel button 154 to select menu items displayed on the display unit 151 of the user interface 15, outputs and stores the information and communication program in the ROM 12 to the USB memory 2, and removes the USB memory 2 after the necessary information has been stored.

The procedure for exporting information to the USB memory 2 in the second embodiment comprises creating an information file containing the model name and IP address of the printer 1 and the address of the driver server 4 in the USB memory 2 connected to the printer 1, creating an autorun information file (autorun.inf) that automatically runs the communication program on the host PC 3, and copying the communication program (drvInstaller.exe) that installs the printer driver in the host PC 3.

Steps S3-1 to S3-9 in FIGS. 10A and 10B are similar to steps S1-1 to S1-9 in FIGS. 7A and 7B in the first embodiment, and steps S3-11 to S3-14 in FIGS. 10B and 10C are similar to steps S1-10 to S1-13 in FIGS. 7B and 7C in the first embodiment. Detailed explanations of these steps will be omitted, although some of these steps will be referred to in the descriptions of other steps.

When the communication program in the communication program section 124 has been successfully copied to the USB memory 2 (Yes in step S3-9), an autorun information file (autorun.inf) is created in the USB memory 2 as shown in FIG. 9A, and the printer 1 determines whether or not the autorun information file has been successfully created (S3-10). If the autorun information file has not been successfully created (No in step S3-10), the printer 1 executes error processing.

When the autorun information file has been successfully created (Yes in step S3-10), the display unit 151 of the user interface 15 of the printer 1 displays a message indicating that the export operation has been successfully completed (information has been successfully written in the USB memory), and that the USB memory can now be removed safely (S3-11). The information written in the USB memory 2 is recorded as a trio of files created in the root directory of the USB memory under the file names 'DrvInstaller.exe' for the communication program copied from the printer 1, 'Install.ini' for the information file created in the printer 1, and 'Autorun.inf' for the autorun program, created by the printer 1, that automatically starts the DrvInstaller.exe communication program on the host PC 3. The error processing executed if the Autorun.inf file is not created successfully (No in step S3-10) is similar to the error processing executed if the communication program is not successfully copied from the communication program section 124 into the USB memory 2 (No in step S3-9), differing only in the content of the error message displayed.

The operation of the host PC 3 of the second embodiment is similar to the operation shown in FIGS. 8A to 8C in the first embodiment. The difference between the first and second embodiments is that the DrvInstaller.exe communication program is started by the user in the first embodiment, but is started automatically, according to the information in the Autorun.inf file, in the second embodiment.

Since the DrvInstaller.exe communication program is started automatically in the second embodiment, without user intervention, the second embodiment provides a further improvement in convenience of use of the printer.

Third Embodiment

The third embodiment is similar to the first embodiment, except that the printer 1 has a plurality of emulation functions, each of which requires a separate printer driver. The emulation functions supported in the third embodiment include a PS emulation function that enables the printer 1 to print files coded in the PostScript page description language, and a PCL emulation function that enables the printer 1 to print files coded in the Printer Command Language (PCL) page description language.

Figure 11A:
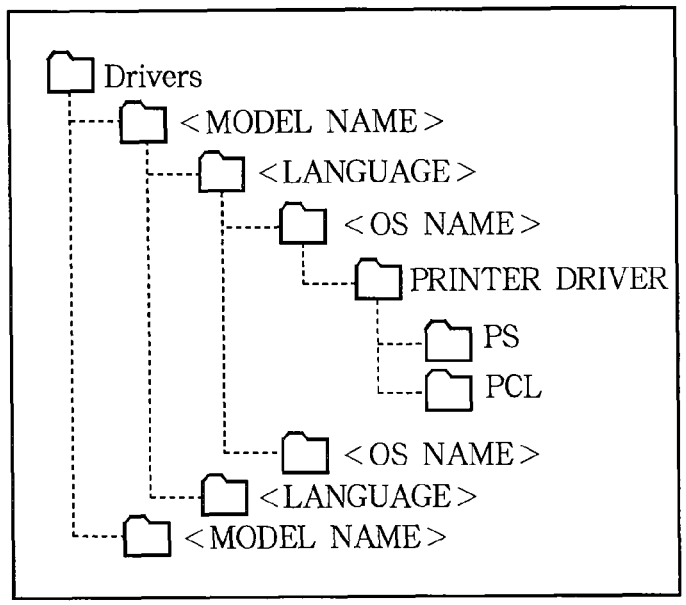
FIG. 11A is a display showing how printer drivers are stored in the driver server in a third embodiment of the invention.
Figure 11B:
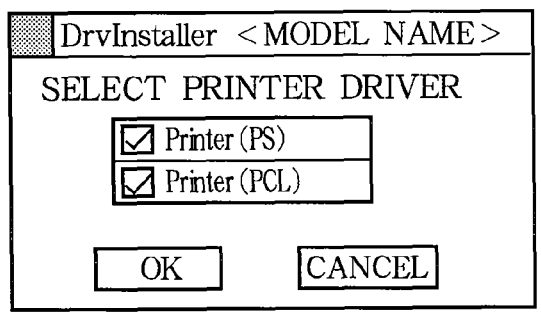
FIG. 11B shows an emulation prompt displayed in the third embodiment.
Figure 11C:
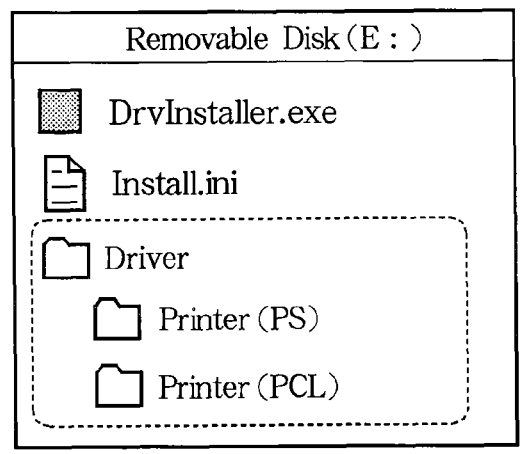
FIG. 11C shows information displayed about the USB mass storage device (USB memory) after the printer driver is downloaded by the communication program in the third embodiment.

FIG. 11A illustrates the tree structure of folders in which printer drivers are stored in the driver server in the third embodiment. FIG. 11B shows how the communication program prompts the user to select a printer driver for an emulation function after starting to operate. FIG. 11C shows information displayed about the USB mass storage device (removable disk) after the printer driver is downloaded by the communication program in the third embodiment.

The data storage tree structure of the driver server 4 in the third embodiment differs from the structure in the first embodiment. As shown in FIG. 11A, the tree includes a model name layer, a language name layer, an OS layer, a printer driver layer, and additionally a page description language (PDL) layer under the printer driver layer, for storing printer drivers that support different page description languages. The information needed to specify a particular printer driver now includes the operating system and language of the host PC on which the printer driver will run and the printer emulation supported by the printer driver. The DrvInstaller.exe program in the third embodiment provides an additional printer driver selection screen, shown in FIG. 11B, on which the user can select the printer drivers to be installed. Either the PostScript (PS) printer driver or the PCL printer driver, or both, can be installed.

As far as the printer 1 is concerned, the third embodiment operates in the same way as the first embodiment, substantially as shown in FIGS. 7A to 7C. The only difference is that a different communication program is copied from the printer 1 to the USB memory 2.

Figure 12A:
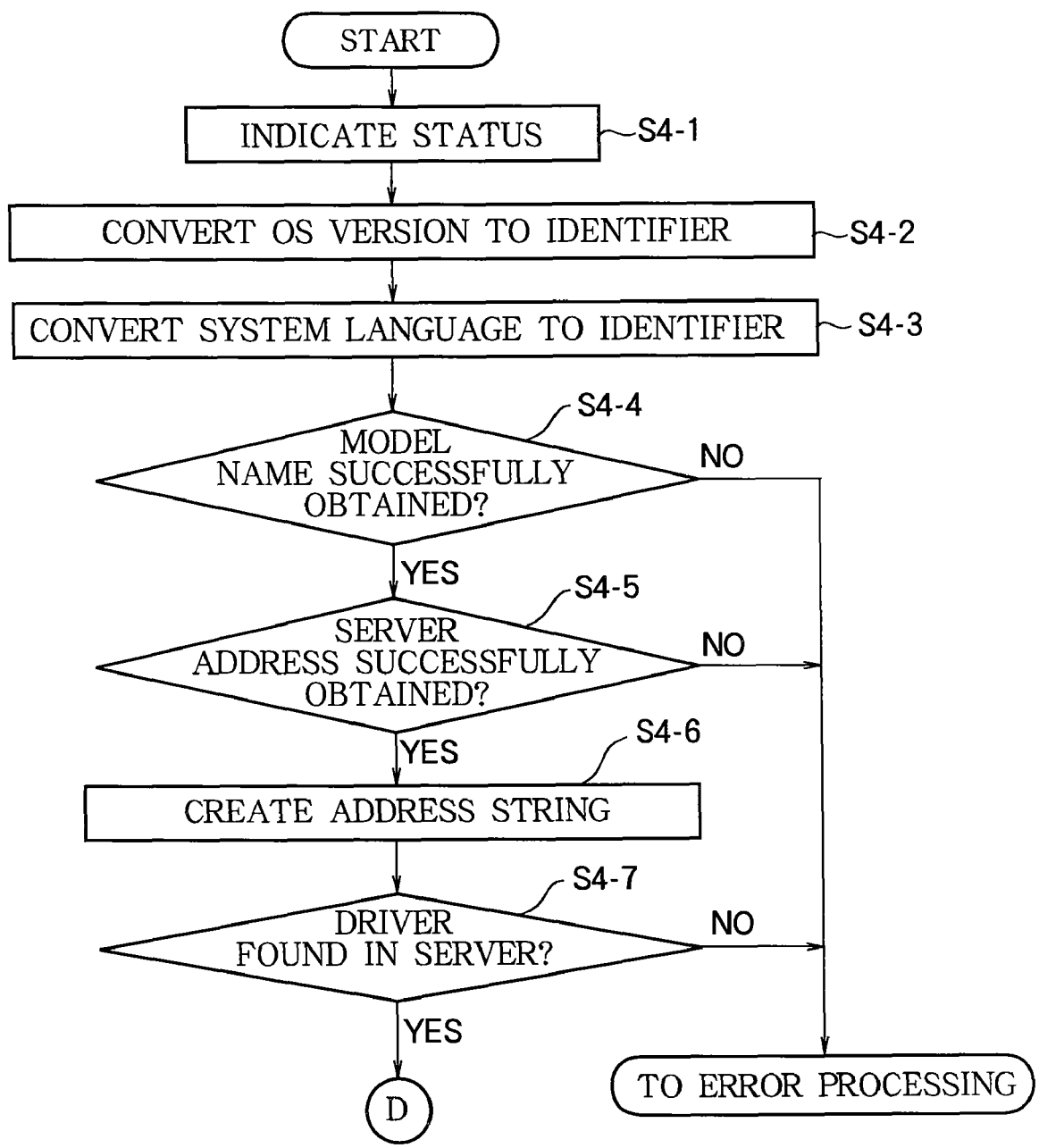
FIGS. 12A to 12D constitute a flowchart illustrating operations from the time the USB memory in the third embodiment, with information stored therein, is connected to the host computer to the time the printer become usable.
Figure 12B:
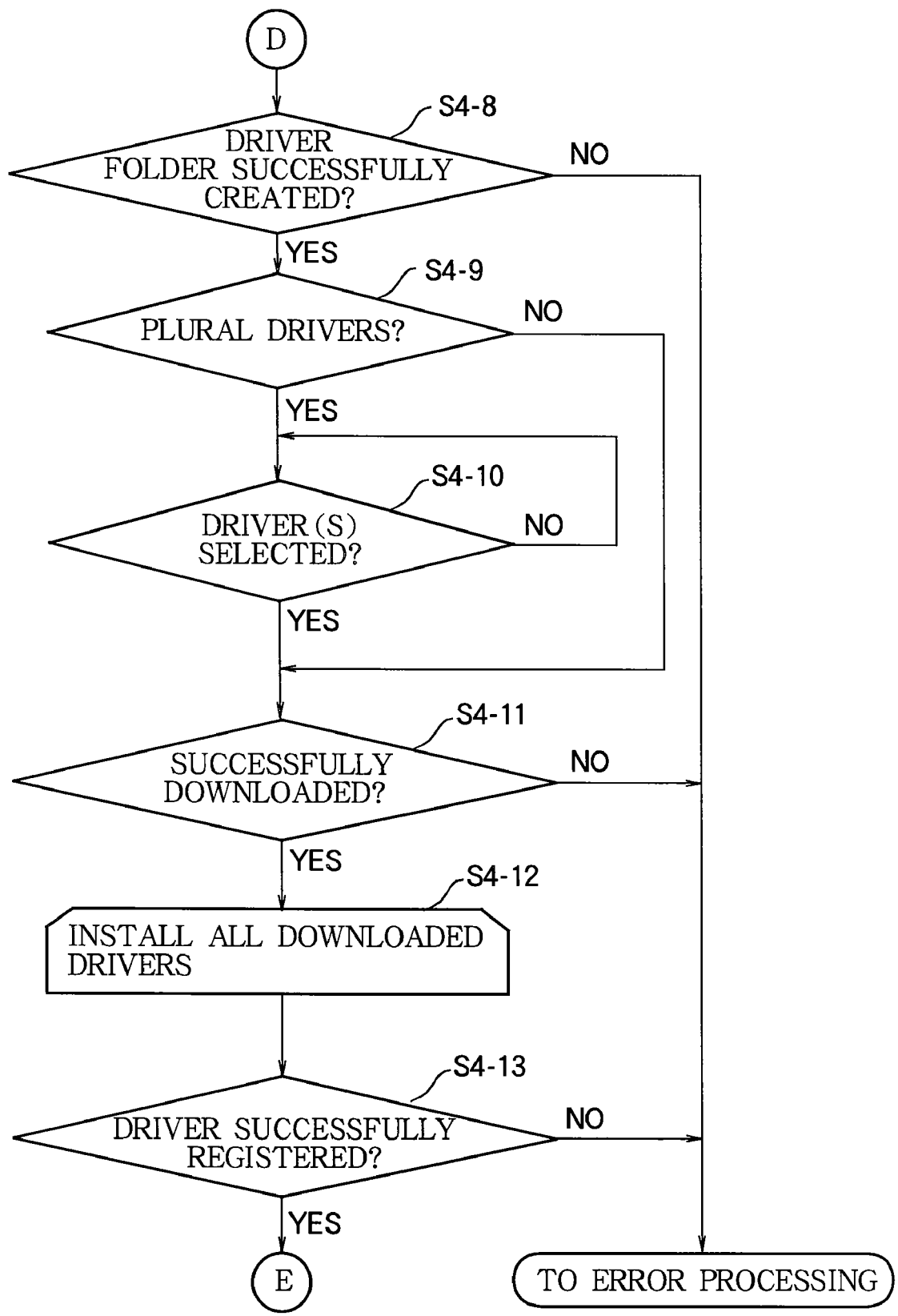
Figure 12C:
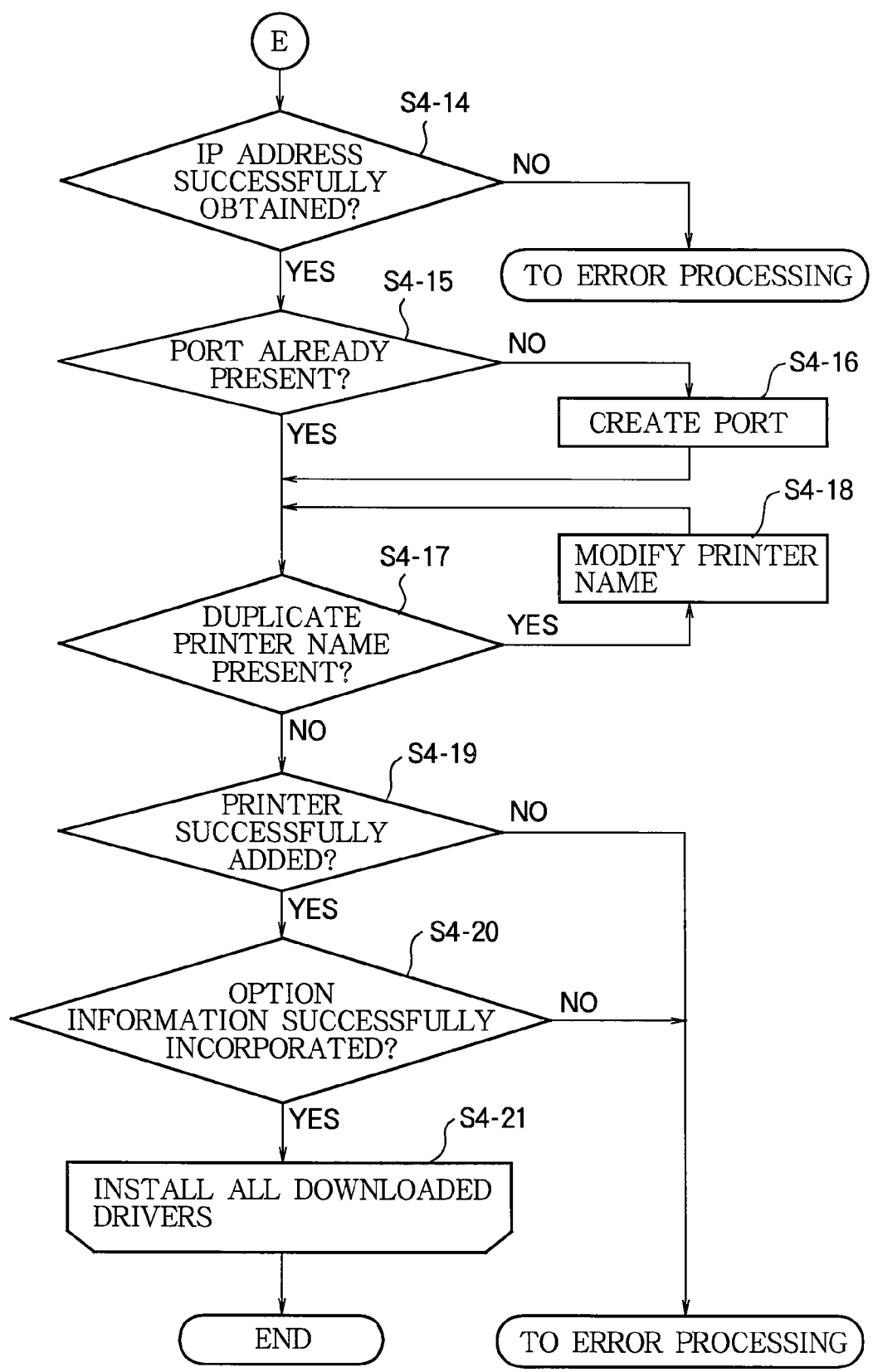
Figure 12D:
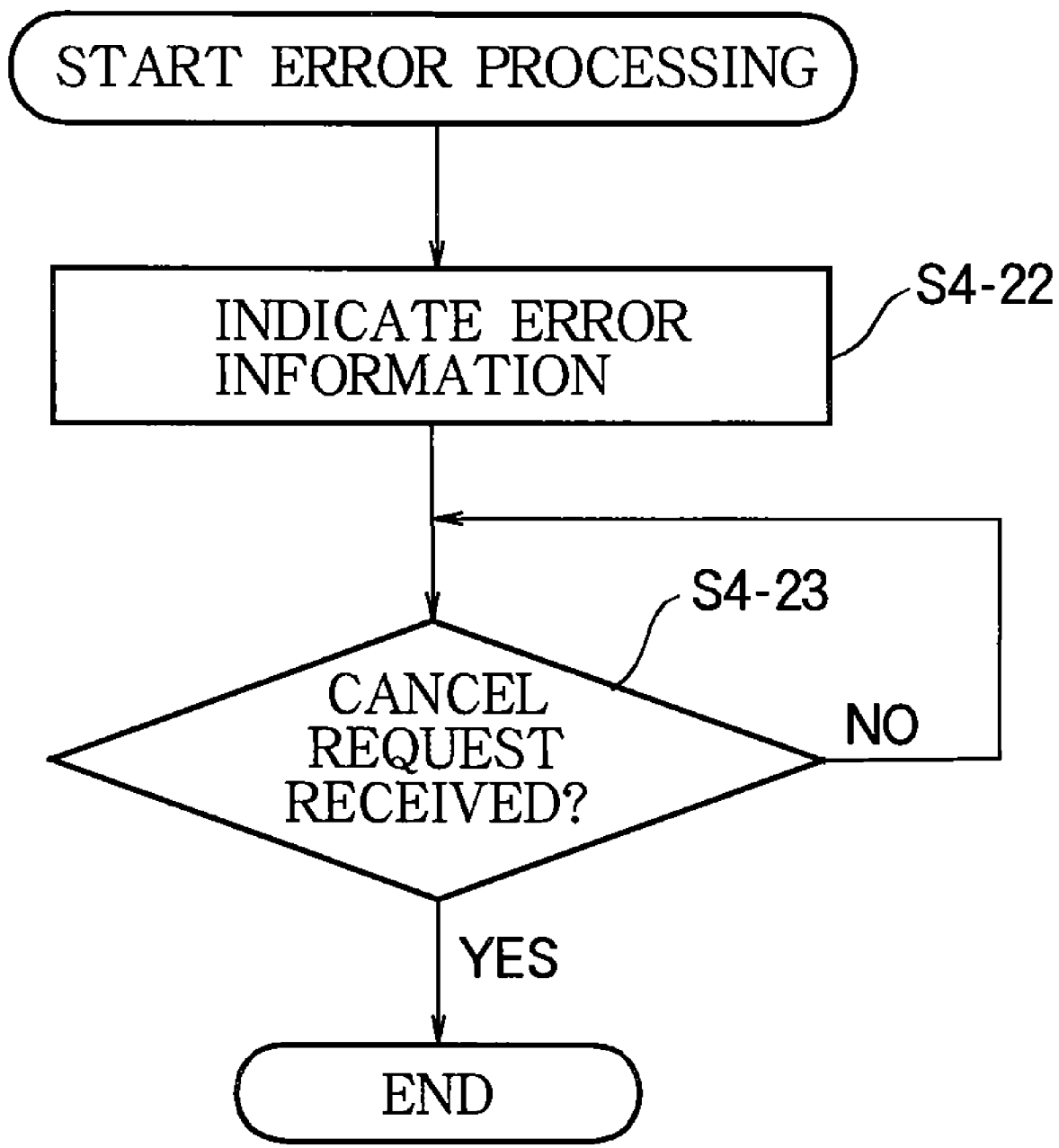

The operation of the host PC 3 in the third embodiment, is illustrated in FIGS. 12A to 12D. Steps S4-1 to S4-8 in FIGS. 12A and 12B are similar to steps S2-1 to S2-8 in FIG. 8A in the first embodiment. Step S4-11 in FIG. 12B is similar to step S2-9 in FIG. 8A. Steps S4-13 to S4-20 in FIGS. 12B and 12C are similar to steps S2-10 to S2-17 in FIGS. 8A and 8B. Steps S4-22 and S4-23 in FIG. 12D are similar to steps S2-18 and S2-19 in FIG. 8C. Steps S4-12 to S4-21 in FIGS. 12B and 12C are repeated, however, so the processing performed in steps S2-10 to step S2-17 in FIGS. 8A and 8B in the first embodiment is repeated as necessary. Processing already described in the first embodiment will not be explained in detail.

When a 'Driver' folder has been successfully created in the USB mass storage device as shown in FIG. 4D, (Yes in step S4-8), the host PC 3 determines whether or not the driver server 4 has printer drivers supporting a plurality of emulation functions (step S4-9). In this example, a PostScript printer driver and a PCL printer driver may be present, as shown in FIG. 11A. If only one printer driver is present (No in step S4-9), step S4-11 is executed as in the first embodiment.

When there are printer drivers with a plurality for emulation functions (Yes in step S4-9), the host PC 3 displays a screen on which the user can select the printer driver or drivers to be installed, as in FIG. 11B. The host PC 3 then determines whether or not the user has selected the printer driver(s) to be installed (step s4-10). If the user has not made this selection yet, (No in step S4-10), step S4-10 is repeated. In this embodiment, the user has only two printer drivers to select, but in principle, the selection offered may include any number of printer drivers, and the user can select all of them or any subset of them.

In step S4-11, using the address string described above, the host PC 3 downloads the printer driver(s) selected for the printer 1 from the printer driver section 421 of the driver server 4. For each downloaded printer driver, a separate folder named to identify the printer driver is created in a 'Driver' folder, as shown in FIG. 11C. The host PC 3 determines whether or not all selected drivers have been successfully downloaded (step S4-11). When the selected printer driver(s) have been successfully downloaded (Yes in step S4-11), the number of downloaded printer drivers is recorded, in case the user has selected a plurality of printer drivers, and they are respectively installed in the manner described in the first embodiment (steps S4-12 to S4-21). If any selected printer driver cannot be successfully downloaded (No in step S4-11), error processing is executed as described in the first embodiment.

The third embodiment provides the same effects as the first embodiment even if the printer supports a plurality of emulation functions.

In a variation of the third embodiment, the printer driver or drivers supporting the desired emulation functions are selected, either automatically or by the user, when the printer creates the information file in the USB memory, instead of being selected by the user after the communication program accesses the server.

The invention is not limited to the use of USB interfaces to transfer information from the printer to the host computer; it is also possible to use local area network (LAN) interfaces or interfaces complying with the IEEE 1394 standard established by the Institute of Electrical and Electronics Engineers. The invention is applicable not only to printers but also to facsimile machines, scanners, copiers, and multifunction printer (MFP) devices that combine printing, scanning, and copying functions. The administrative server and the host device may be connected to the same network, or may be connected to different networks and communicate through the Internet. For example, the administration server may be accessible through an Internet site operated by the printer vendor.

Those skilled in the art will recognize that further variations are possible within the scope of the invention, which is defined in the appended claims.

What is claimed is:

1. A method of installing an image processing apparatus control program, the method being executed by a host apparatus, an image processing apparatus, and a driver server comprising:
   a transfer step in which the host apparatus receives transfer of a printer address indicating a location of the image processing apparatus on a network, apparatus identifying information identifying the image processing apparatus, a server address of the driver server storing an image processing apparatus control program for control of image processing in the image processing apparatus, and a communication program for communicating with the driver server through the network from the image processing apparatus, the host apparatus being operable to output at least image data and image processing commands to the image processing apparatus through the network;
   an access step in which the host apparatus runs the communication program and accesses the driver server through the network according to the server address;
   a selection step in which the host apparatus selects, from within the driver server, the image processing apparatus control program of the image processing apparatus identified by the apparatus identifying information;
   a download step in which the host apparatus downloads the image processing apparatus control program from the driver server;
   an installation step in which the host apparatus installs the image processing apparatus control program in the host apparatus; and
   a setting step in which the host apparatus sets the printer address as the location on the network of the image processing apparatus controlled by the image processing apparatus control program,
   wherein the transfer step comprises:
      a first connection step in which a detachable portable external memory is connected to the image processing apparatus;
      a storing step in which the image processing apparatus stores the printer address, the apparatus identifying information, the server address, and the communication program in the detachable portable external memory;
      a displaying step in which the image processing apparatus displays a message indicating that output of data to the detachable external memory has been completed;
      a second connection step in which the detachable portable external memory is disconnected from the image processing apparatus and is connected to the host apparatus,
      wherein in the displaying step, the image processing apparatus reverts to displaying a message indicating an ordinary condition when the data are not being output to the detachable portable external memory after the detachable portable external memory is disconnected from the image processing apparatus; and
      wherein in the access step, the host apparatus runs the communication program in the detachable portable external memory.

2. The method of claim 1, wherein the apparatus identifying information includes at least a model name of the image processing apparatus.

3. The method of claim 1, wherein, in the storing step, before storing the communication program to the detachable portable external memory, the image processing apparatus determines whether the detachable portable external memory is connected to the image processing apparatus.

4. The method of claim 3, wherein, in the storing step, after determining that the detachable portable external memory is connected to the image processing apparatus, the image processing apparatus stores the communication program in response to input of a command to the image processing apparatus.

5. The method of claim 4, wherein, in the storing step, the image processing apparatus, in response to said command, copies the communication program into the detachable portable external memory connected to the image processing apparatus, and creates an information file including at least the printer address and the apparatus identifying information.

6. The method of claim 4, wherein, in the storing step, the image processing apparatus also creates an autorun file for automatically running the communication program in the host apparatus.

7. The method of claim 1, wherein, in the second connection step, the host apparatus recognizes the detachable portable external memory as a memory area, enabling the communication program to be run on the detachable portable external memory.

8. The method of claim 7, wherein, in the access step, the host apparatus runs the communication program automatically or in response to a command from a user.

9. The method of claim 1, wherein, in the selection step, the communication program obtains system information from an operating system (OS) running on the host apparatus, creates an address string designating a location storing the image processing apparatus control program by using the system information together with the apparatus identifying information, and sends the address string to the driver server through the network to select the image processing apparatus control program.

10. The method of claim 9, wherein the system information includes at least OS version information and language information designating a human language used by the operating system.

11. The method of claim 9, wherein, in the selection step, the host apparatus selects the image processing apparatus control program from within the driver server, if the driver server stores image processing apparatus control programs for different page description languages, the communication program prompts a user of the host apparatus to select a page description language.

12. The method of claim 11, wherein, in the selection step, the host apparatus selects the image processing apparatus control program from within the driver server, if the driver server stores image processing apparatus control programs for different page description languages, the communication prompts the user of the host apparatus to select one or more image processing apparatus control programs.

13. The method of claim 1, wherein, in the installation step, the host apparatus sets configuration information about the image processing apparatus in the image processing apparatus control program by communicating with the image processing apparatus.

14. The method of claim 12, wherein, in the installation step, if the user selects a plurality of image processing apparatus control programs, the host apparatus installs the plurality of image processing apparatus control programs selected by the user.

15. The method of claim 1, wherein in the setting step, the host apparatus creates a printer port name string using the printer address, determines whether or not a port of the printer port name string is already present, and if the port of the printer port name string is not already present, creates the port of the printer port name string.

16. An image processing apparatus comprising:
a network interface communicably connected through a network to a host apparatus of the image processing apparatus, operable for communication of at least image data and image processing commands through the network;
a printing unit for forming an image according to the image data and the image processing commands;
a user interface including an input unit for input of commands and information from a user and a display unit for displaying messages to the user and displaying confirmation of input;
a control unit for receiving, from the host apparatus, through the network interface, image data and image processing commands output by an image processing apparatus control program installed in the host apparatus and causing the printing unit to form an image based on the image data; and
a memory for storing a printer address indicating a location of an image processing apparatus on the network, apparatus identifying information identifying the image processing apparatus, a server address of a driver server storing an image processing apparatus control program for controlling image processing in the image processing apparatus, and a communication program for communicating with the driver server through the network; and
an external memory interface connectable to a detachable portable external memory for detecting the detachable portable external memory when the detachable portable external memory is connected and controlling read and write access to the detachable portable external memory,
wherein the control unit transfers the printer address, the apparatus identifying information, and the communication program from the image processing apparatus to the host apparatus, and if the transfer is successful, indicates on the display unit that the transfer was successful;
when the host apparatus runs the communication program, the communication program communicates with the driver server through the network, selects an image processing apparatus control program of the image processing apparatus identified by the apparatus identifying information from within the driver server, downloads the image processing apparatus control program that has been selected, installs the image processing apparatus control program in the host apparatus, and sets the printer address as the location on the network of the image processing apparatus controlled by the image processing apparatus control program;
when the detachable portable external memory is connected to the image processing apparatus, the control unit transfers the printer address, the apparatus identifying information, and the communication program from the image processing apparatus to the detachable portable external memory, if the transfer is successful, indicates on the display unit that the transfer was successful, and after the detachable portable external memory is disconnected from the image processing apparatus, indicates an ordinary condition when data are not being output to the detachable portable external memory on the display; and
if the transfer is successful and the detachable portable external memory is then connected to the host apparatus, the communication program in the detachable portable external memory is run by the host apparatus.

* * * * *